United States Patent
Ko et al.

(10) Patent No.: US 11,646,911 B2
(45) Date of Patent: May 9, 2023

(54) METHOD FOR PERFORMING RADIO LINK MONITORING AND APPARATUS THEREFOR

(71) Applicant: LG ELECTRONICS INC., Seoul (KR)

(72) Inventors: Hyunsoo Ko, Seoul (KR); Heejin Kim, Seoul (KR); Hanbyul Seo, Seoul (KR); Sukhyon Yoon, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 17/275,004

(22) PCT Filed: Sep. 27, 2019

(86) PCT No.: PCT/KR2019/012577
§ 371 (c)(1),
(2) Date: Mar. 10, 2021

(87) PCT Pub. No.: WO2020/067760
PCT Pub. Date: Apr. 2, 2020

(65) Prior Publication Data
US 2022/0070025 A1    Mar. 3, 2022

(30) Foreign Application Priority Data
Sep. 28, 2018   (KR) .......................... 10-2018-0116615

(51) Int. Cl.
*H04L 25/02* (2006.01)
*H04B 7/0408* (2017.01)
*H04W 24/02* (2009.01)

(52) U.S. Cl.
CPC ...... *H04L 25/0204* (2013.01); *H04L 25/0224* (2013.01); *H04B 7/0408* (2013.01); *H04W 24/02* (2013.01)

(58) Field of Classification Search
CPC ............. H04L 25/0204; H04L 25/0224; H04L 25/0228; H04B 7/0408; H04B 7/088;
(Continued)

(56) References Cited

U.S. PATENT DOCUMENTS

2019/0261234 A1 * 8/2019 Park .................. H04W 36/0069
2021/0045076 A1 * 2/2021 Tomeba ................ H04W 16/28

FOREIGN PATENT DOCUMENTS

KR    20110023051    3/2011
KR    20120005545    1/2012
(Continued)

OTHER PUBLICATIONS

3GPP TS 38.213 v15.2.0, Jun. 2018, 3GPP.*
PCT International Application No. PCT/KR2019/012577, International Search Report dated Jan. 17, 2020, 26 pages.

*Primary Examiner* — Jae Y Lee
(74) *Attorney, Agent, or Firm* — Lee Hong Degerman Kang Waimey

(57) ABSTRACT

The present disclosure provides a method for performing radio link monitoring (RLM) by a terminal for which a plurality of carriers are configured, in a wireless communication system. Specifically, the method may comprise: receiving a reference signal through one carrier among the plurality of carriers: measuring the radio link quality of the one carrier on the basis of the reference signal, and determining whether wireless communication through the plurality of carriers is possible, on the basis of the measured radio link quality.

5 Claims, 26 Drawing Sheets

(58) Field of Classification Search
CPC .... H04B 7/0695; H04W 24/02; H04W 48/16; H04W 24/08
See application file for complete search history.

(56) References Cited

FOREIGN PATENT DOCUMENTS

| | | |
|---|---|---|
| WO | 2010143851 | 12/2010 |
| WO | 2011019182 | 2/2011 |
| WO | 2014115989 | 7/2014 |

\* cited by examiner (A) CONTROL-PLANE PROTOCOL STACK (B) USER-PLANE PROTOCOL STACK (a)

(b)

(a)

(b)

(a)

(b)

METHOD FOR PERFORMING RADIO LINK MONITORING AND APPARATUS THEREFOR

CROSS-REFERENCE TO RELATED APPLICATIONS

This application is the National Stage filing under 35 U.S.C. 371 of International Application No. PCT/KR2019/012577, filed on Sep. 27, 2019, which claims the benefit of earlier filing date and right of priority to Korean Application No. 10-2018-0116615, filed on Sep. 28, 2018, the contents of which is incorporated by reference herein in its entirety.

TECHNICAL FIELD

The present disclosure relates to a method and apparatus for performing radio link monitoring, and more particularly, to a method and apparatus for performing radio link monitoring in vehicle-to-vehicle (V2V) wireless communication using a plurality of frequency bands.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle-to-everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The present disclosure is intended to provide a method and apparatus for performing radio link monitoring.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of performing radio link monitoring (RLM) by a user equipment (UE) configured with a plurality of carriers in a wireless communication system includes receiving a reference signal via one carrier of the plurality of carriers, measuring a radio link quality of the one carrier based on the reference signal, and determining whether it is possible to perform wireless communication via the plurality of carriers, based on measurement of the radio link quality.

The reference signal may be a synchronization signal block (SSB).

Further, the one carrier may have a lower frequency band than remaining carriers except for the one carrier among the plurality of carriers.

Further, the determination may include, based on that it is determined that it is possible to perform wireless communication in the one carrier, based on the measurement, determining that it is possible to perform wireless communication via all of the plurality of carriers.

Further, the method may further include, based on that it is determined that it is possible to perform wireless communication in the plurality of carriers, transmitting data via a carrier having a higher frequency band than the one carrier among the plurality of carriers.

Further, the UE is communicable with at least one of another UE, a network, abase station, or an autonomous driving vehicle.

According to the present disclosure, an apparatus for performing RLM in a wireless communication system, the apparatus includes at least one processor and at least one memory operatively coupled to the at least one processor and storing instructions which when executed, cause the at least one processor to perform specific operations. The specific operations include receiving a reference signal in one carrier of a plurality of carriers configured for the apparatus, measuring a radio link quality of the one carrier based on the reference signal, and determining whether it is possible to perform wireless communication in the plurality of carriers, based on measurement of the radio link quality.

The reference signal may be an SSB.

Further, the one carrier may have a lower frequency band than remaining carriers except for the one carrier among the plurality of carriers.

Further, based on that it is determined that it is possible to perform wireless communication in the one carrier, based on the measurement, it may be determined that it is possible to perform wireless communication via all of the plurality of carriers.

Further, based on that it is determined that it is possible to perform wireless communication in the plurality of carriers, data may be transmitted in a carrier having a higher frequency band than the one carrier among the plurality of carriers.

Further, the apparatus may be communicable with at least one of a UE, a network, a base station, or an autonomous driving vehicle.

According to the present disclosure, a UE for performing RLM in a wireless communication system includes at least one transceiver, at least one processor, and at least one memory operatively coupled to the at least one processor and storing instructions which when executed, cause the at least one processor to perform specific operations. The specific operations include receiving, via the at least one transceiver, a reference signal in one carrier of a plurality of carriers configured for the UE, measuring a radio link quality of the one carrier based on the reference signal, and determining whether it is possible to perform wireless communication in the plurality of carriers, based on measurement of the radio link quality.

Advantageous Effects

According to the present disclosure, radio link monitoring may be efficiently performed even in vehicle-to-vehicle (V2V) communication using a plurality of frequency bands.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
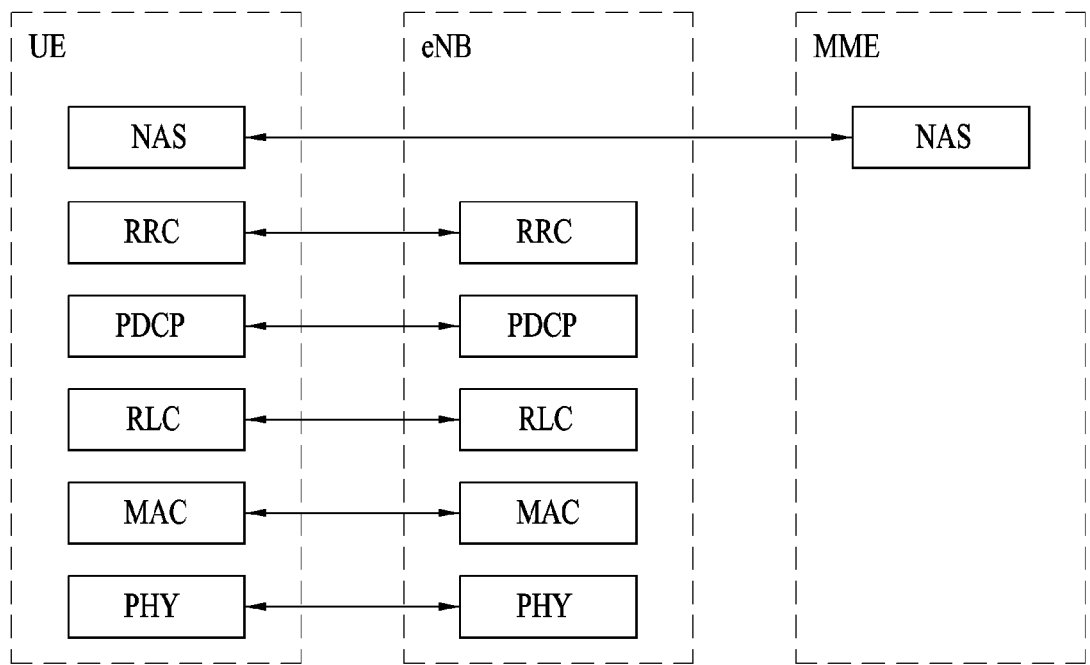
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
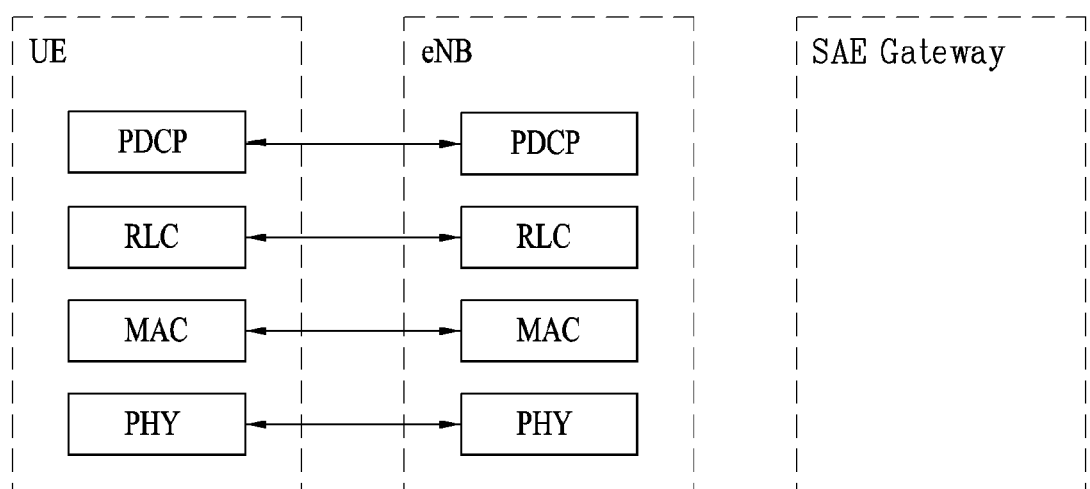

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary.

Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
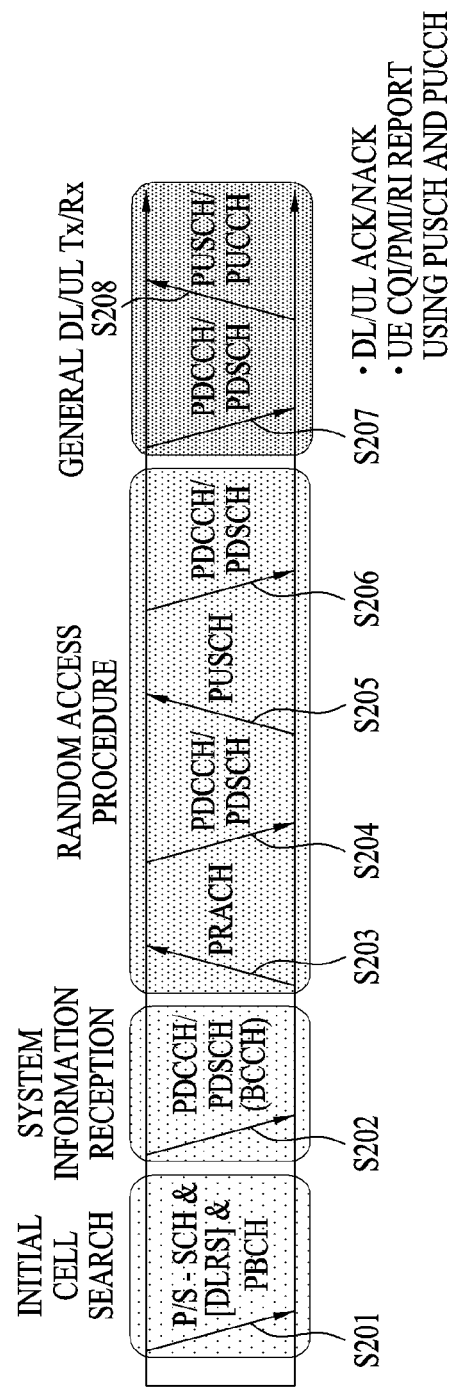
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/

NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
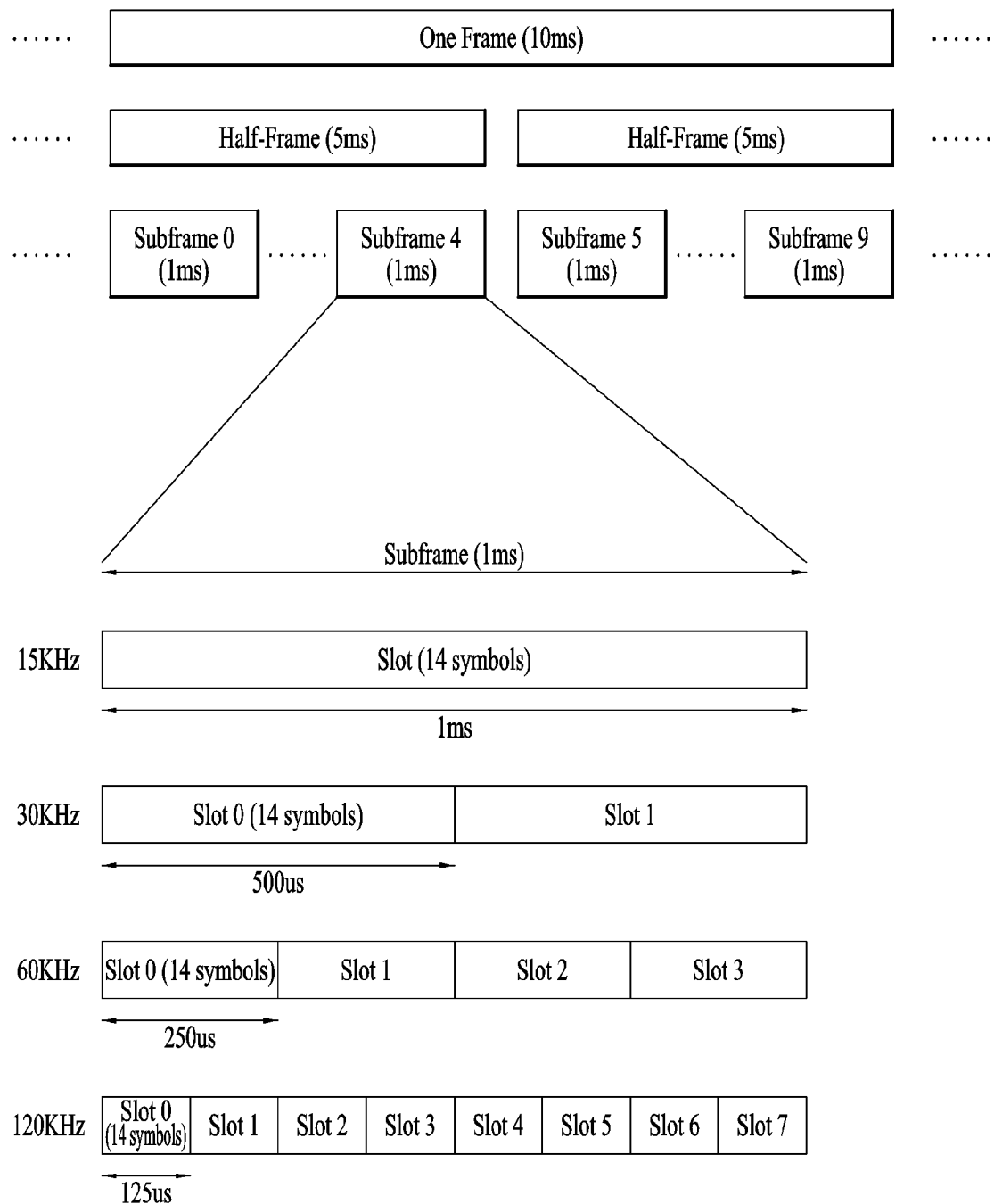
FIGS. 3, 4 and 5 are diagrams illustrating structures of a radio frame and slots used in a new RAT (NR) system.
Figure 4:
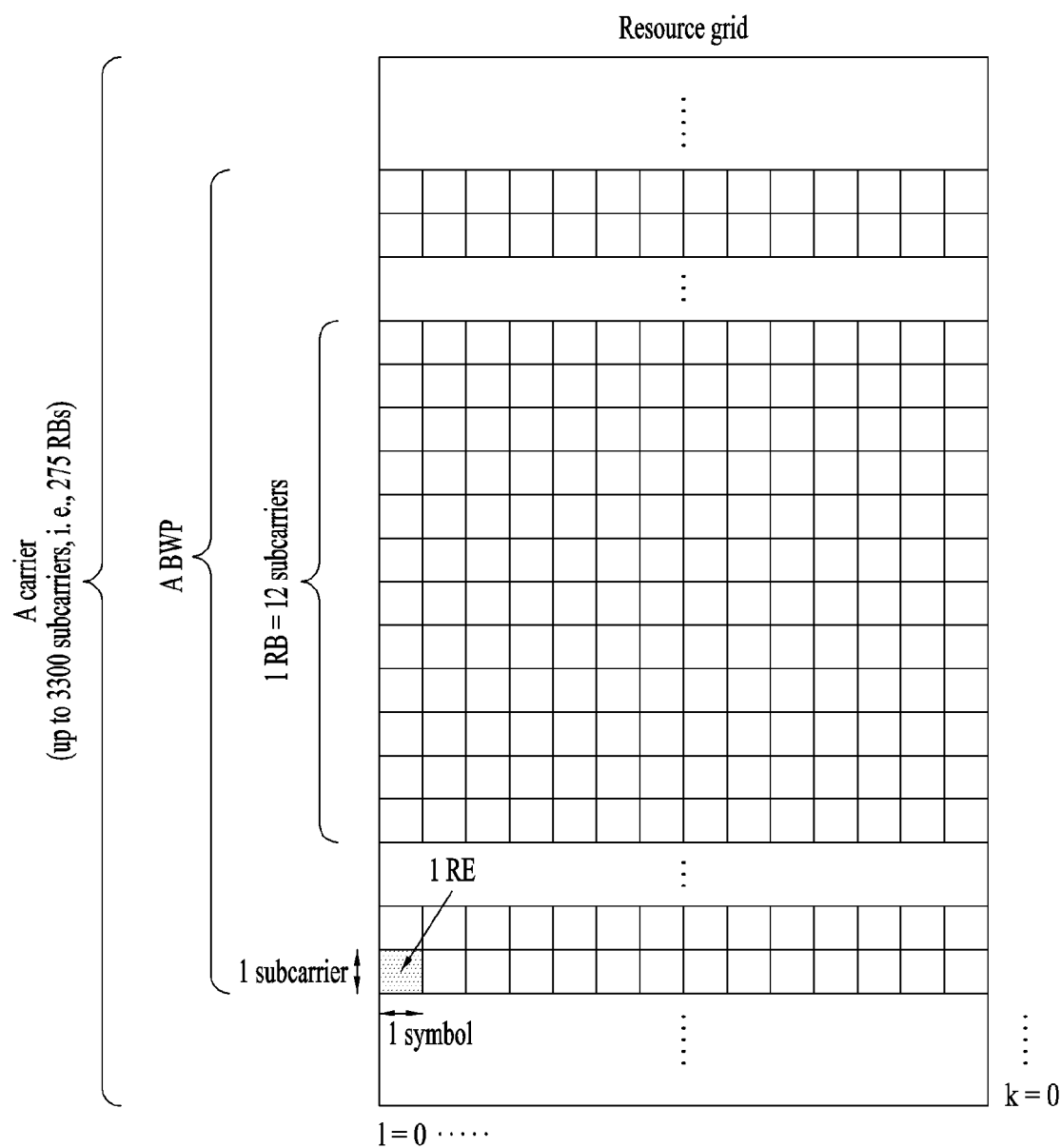

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe

[Table 2] illustrates that the number of symbols per slot, the number of slots per frame, and the number of slots per subframe vary according to the SCS when the extended CP is used.

TABLE 2

| SCS(15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 5:
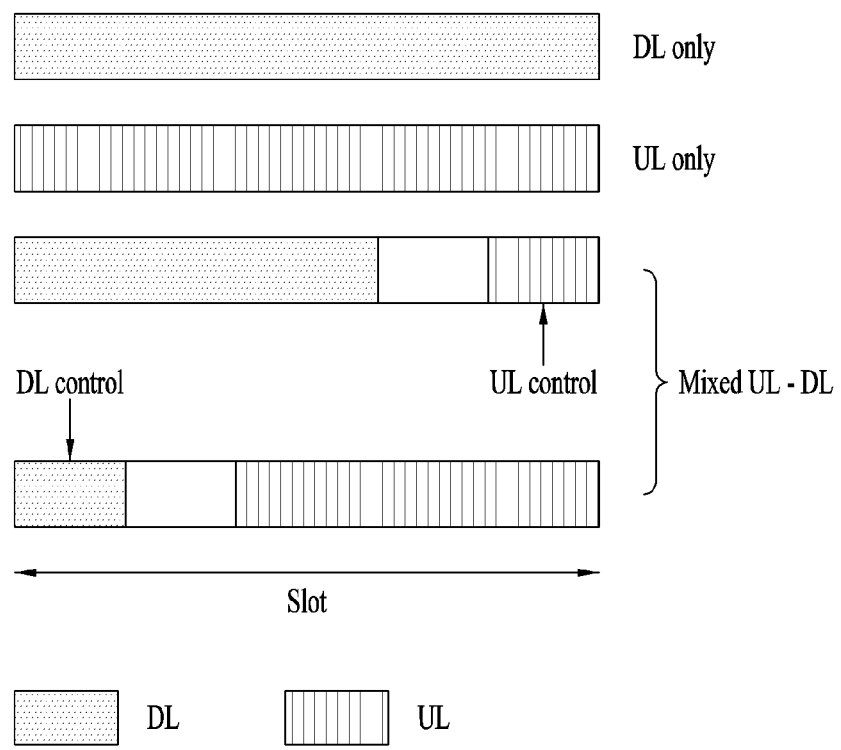

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
        DL region: (i) DL data region, (ii) DL control region+DL data region
        UL region: (i) UL data region, (ii) UL data region+ UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

V2X (Vehicle-to-Everything)

V2X communication refers to communication between vehicles and all entities, covering vehicle-to-vehicle (V2V) which is communication between vehicles, vehicle-to-infrastructure (V2I) which is communication between a vehicle and an eNB or road side unit (RSU), vehicle-to-pedestrian (V2P) which is communication between a vehicle and a UE carried by an individual person (pedestrian, biker, vehicle driver, or passenger), and vehicle-to-network (V2N).

In its meaning, V2X communication may be identical to or encompass V2X sidelink (SL) or NR V2X.

V2X communication may find its uses in various services including, for example, forward collision warning, an automatic parking system, cooperative adaptive cruise control (CACC), loss of control warning, traffic queue warning, safety warning for vulnerable road users, emergency vehicle warning, speed warning during driving on curved roads, and traffic flow control.

V2X communication may be provided via a PC5 interface and/or a Uu interface. In a wireless communication system supporting V2X communication, specific network entities may exist to support communication between vehicles and all entities. For example, the network entities may include a BS (eNB), an RSU, a UE, and an application server (e.g., a traffic safety server).

A UE performing V2X communication may be a vehicle UE (V-UE), a pedestrian UE, a BS-type (eNB-type) RSU, a UE-type RSU, or a robot equipped with a communication module, as well as a general portable UE (handheld UE).

V2X communication may be conducted between UEs, directly or through network entity(s). Depending on these V2X communication schemes, V2X operation modes may be classified.

For V2X communication, the pseudonymity and privacy of UEs need to be supported to prevent an operator or a third party from tracking UE identifiers (IDs) in regions where V2X is supported.

Terms frequently used for V2X communication are defined as follows.

RSU (Road Side Unit): An RSU is a V2X-enabled device which may transmit/receive a signal to and/from a moving vehicle by V2I service. The RSU may be a fixed infrastructure entity supporting V2X applications, which may exchange messages with other entities supporting the V2X applications. RSU is a term frequently used in the existing ITS specifications and introduced to the 3GPP specifications to help with easy reading of documents in the ITS industry. The RSU is a logical entity that combines a V2X application logic with the function of a BS (referred to as a BS-type RSU) or a UE (referred to as a UE-type RSU).

V2I service: A type of V2X service, in which one party is a vehicle and the other party is infrastructure.

V2P service: A type of V2X service, in which one party is a vehicle and the other party is a portable device carried by an individual person (e.g., a portable UE carried by a pedestrian, biker, driver, or passenger).

V2X service: A 3GPP communication service type in which a transmission or reception device is related to a vehicle.

V2X-enabled UE: A UE that supports V2X service.

V2V service: A type of V2X service in which both communication parties are vehicles.

V2V communication range: A direct communication range between two vehicles participating in V2V service.

As described above, there are four types of V2X applications which are also called V2X: (1) V2V, (2) V2I, (3) V2N, and (4) V2P.

Figure 6:
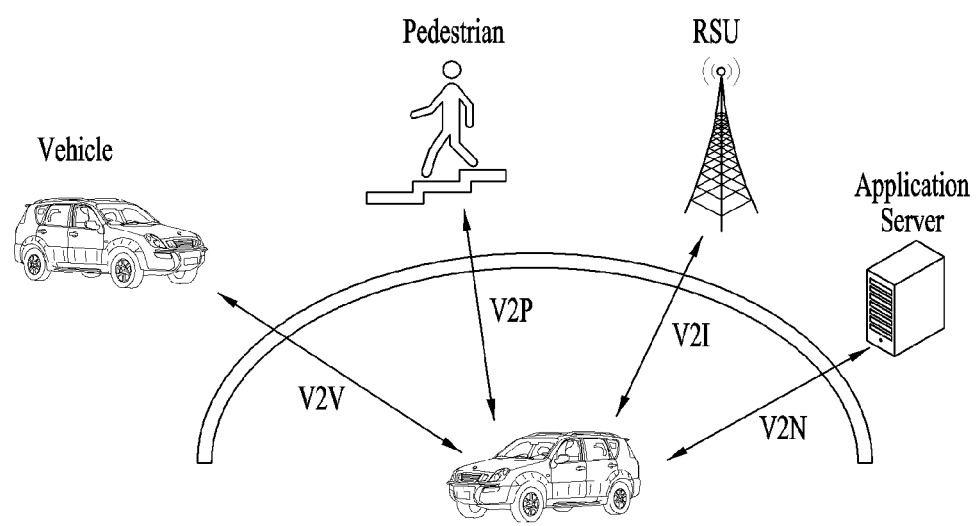
FIG. 6 is a diagram illustrating various types of vehicle-to-everything (V2X) applications.

FIG. 6 is a diagram illustrating the types of V2X applications.

These four types of V2X applications may use "cooperative awareness" to provide more intelligent services to end users. This implies that entities such as a vehicle, roadside infrastructure, an application server, and a pedestrian are allowed to collect, process, and share knowledge of a corresponding regional environment (e.g., information received from other adjacent vehicles or sensor devices) to provide more intelligent information such as cooperative collision warnings or autonomous driving information.

These intelligent transport services and related message sets have been defined by automotive standards developing organizations (SDOs) outside the 3GPP.

Three basic classes for providing ITS services: road safety, traffic efficiency, and other applications are described, for example, in ETSI TR 102 638 V1.1.1: "Vehicular Communications; Basic Set of Applications; Definitions".

The radio protocol architectures of the user plane and control plane for V2X communication may be basically identical to the protocol stack structure for SL. The radio protocol structure of the user plane may include PDCP, RLC, MAC, and PHY, and the radio protocol structure of the control plane may include RRC, RLC, MAC, and PHY. For details of the protocol stacks for V2X communication, refer to 3GPP TS 23.303, 3GPP TS 23.285, 3GPP TS 24.386, and so on.

Figure 7:
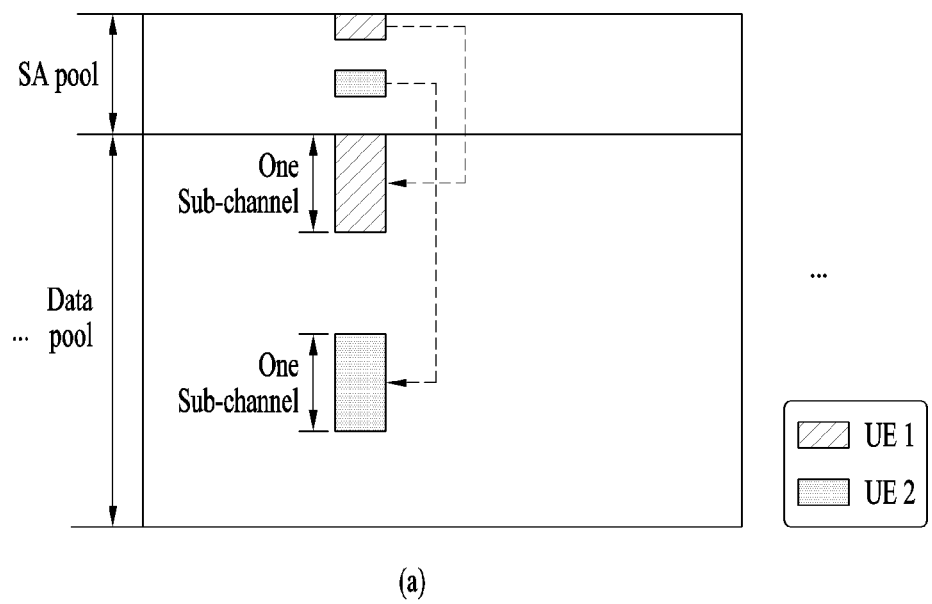
FIGS. 7, 8 and 9 are diagrams illustrating resource allocation and resource selection in V2X.
Figure 7:
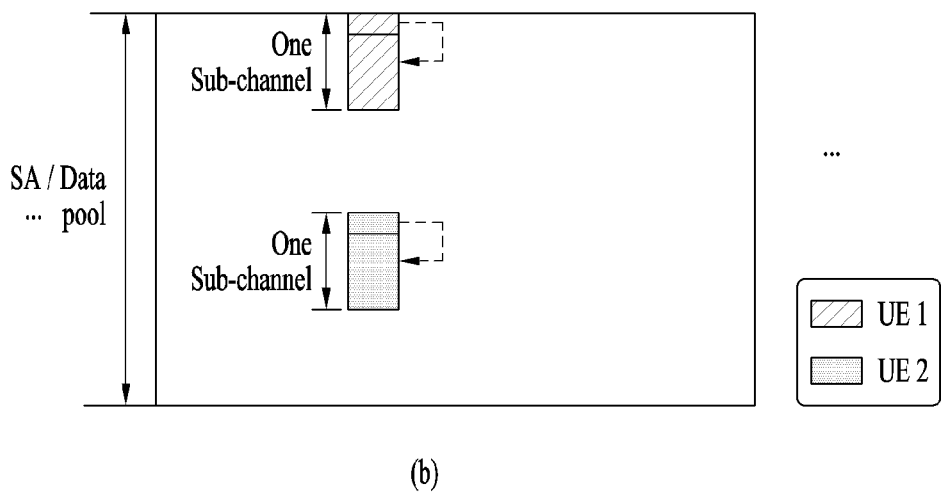

FIG. 7 is a diagram illustrating an example of transmitting a physical sidelink control channel (PSCCH) in SL transmission mode 3 or 4 to which the present disclosure may be applied.

Compared to SL communication, a PSCCH and a PSSCH are transmitted in FDM in V2X communication, that is, in SL transmission mode 3 or 4. Because latency reduction is an important factor in view of the nature of vehicle transmission in V2X communication, the PSCCH and the PSSCH may be transmitted in frequency division multiplexing (FDM) in different frequency resources of the same time resources. Referring to FIG. 7, the PSCCH and the PSSCH may be spaced from each other as illustrated in FIG. 7($a$) or may be contiguous to each other as illustrated FIG. 7($b$). The basic unit of this transmission is a sub-channel. A sub-channel may be a resource unit with a size of one or more RBs on the frequency axis in predetermined time resources (e.g., a time resource unit). The number of RBs included in the sub-channel (i.e., the size and frequency-axis starting position of the sub-channel) may be indicated by higher-layer signaling. The embodiment of FIG. 7 may also be applied to NR SL resource allocation mode 1 or 2.

There are transmission modes 1, 2, 3 and 4 for SL.

In transmission mode 1/3, the BS performs resource scheduling for UE 1 by a PDCCH (more specifically, DCI), and UE 1 performs device-to-device (D2D)/V2X communication with UE 2 according to the resource scheduling. After transmitting sidelink control information (SCI) to UE 2 on a PSCCH, UE 1 may transmit data to UE 2 on a physical sidelink shared channel (PSSCH) based on the SCI. Transmission mode 1 may be applied to D2D communication, and transmission mode 3 may be applied to V2X communication.

Transmission mode 2/4 may be a mode in which the UE autonomously performs scheduling. More specifically, transmission mode 2 is applied to D2D communication. In transmission mode 2, the UE may perform a D2D operation by autonomously selecting resources from a configured resource pool. Transmission mode 4 is applied to V2X communication. In transmission mode 4, after autonomously selecting resources within a selection window through a sensing process, the UE may perform a V2X operation in the selected resources. UE 1 may transmit SCI to UE 2 on a PSCCH and then transmit data to UE 2 on a PSSCH based on the SCI. Hereinafter, a transmission mode may be referred to shortly as a mode.

Control information transmitted from a BS to a UE on a PDCCH may be referred to as downlink control information (DCI), whereas control information transmitted from a UE to another UE on a PSCCH may be referred to as SCI. SCI may include SL scheduling information. Various formats may be available for the SCI, for example, SCI format 0 and SCI format 1.

SCI format 0 may be used for PSSCH scheduling. SCI format 0 may include a frequency hopping flag (1 bit), a resource block allocation and hopping resource allocation field (having a variable number of bits depending on the number of sidelink RBs), a time resource pattern, a modulation and coding scheme (MCS), a time advance indication, a group destination ID, and so on.

SCI format 1 may be used for PSSCH scheduling. SCI format 1 includes priority, resource reservation, frequency resource positions of an initial transmission and a retransmission (having a variable number of bits depending on the number of SL subchannels), a time gap between the initial transmission and the retransmission, an MCS, a retransmission index, and so on.

SCI format 0 may be used in transmission modes 1 and 2, and SCI format 1 may be used in transmission modes 3 and 4.

Now, a detailed description will be given of resource allocation in mode 3 and mode 4 which are applied to V2X. First, mode 3 will be described.

1. Mode 3

Mode 3 may be a scheduled resource allocation mode. The UE may be in an RRC_CONNECTED state to transmit data.

Figure 8:
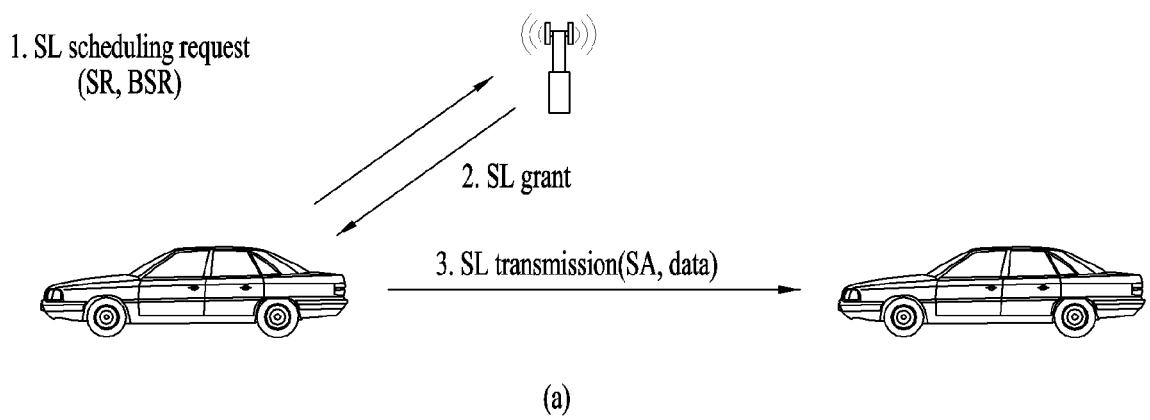
Figure 8:
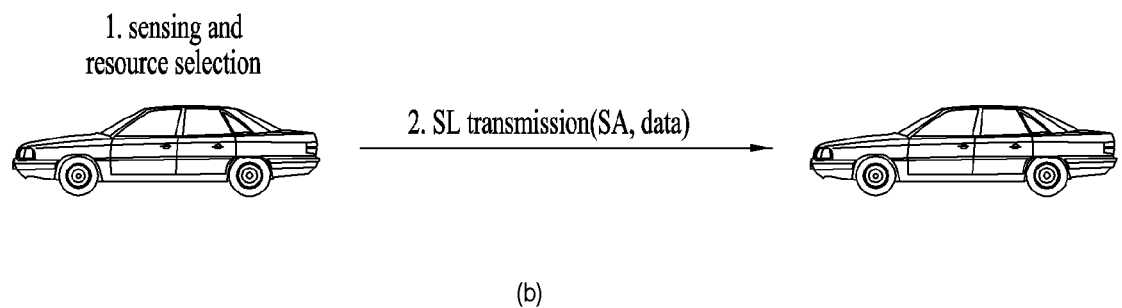

FIG. 8(a) illustrates a mode-3 operation of a UE.

The UE may request transmission/reception resources to the BS, and the BS may schedule resource(s) related to transmission/reception of SCI and/or data for the UE. SL semi-persistent scheduling (SPS) may be supported for the scheduled resource allocation. The UE may transmit/receive SCI and/or data to/from another UE in the allocated resources.

2. Mode 4

FIG. 8(b) illustrates a mode-4 operation of a UE.

Mode 4 may be a UE-autonomous resource selection mode. The UE may perform sensing for (re)selection of SL resources. Based on the result of the sensing, the UE may randomly select/reserve SL resource from among the remaining resources except for specific resources. The UE may perform up to two parallel independent resource reservation processes.

Sensing and resource selection in mode 4 will be described in greater detail.

Figure 9:
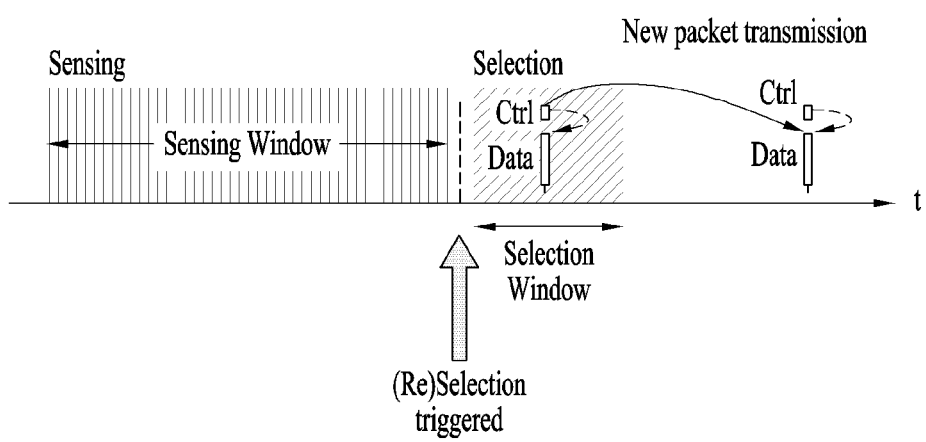

FIG. 9 illustrates sensing and resource selection in mode 4.

As described above, the UE may perform sensing to select mode-4 transmission resources. In V2X communication, two transmissions per MAC protocol data unit (MAC PDU) may be performed. For example, referring to FIG. 9, when resources are selected for an initial transmission, resources for a retransmission may be reserved after a predetermined time gap.

For example, the UE may identify transmission resources reserved or in use by other UEs through sensing within a sensing window and select any resources with less interference from among the remaining resources in the sensing window except for the identified transmission resources.

For example, the UE may decode a PSCCH including information about the periodicity of reserved resources within the sensing window, and measure PSSCH reference signal received power (RSRP) in periodically determined resources based on the PSCCH. Resources with PSSCH RSRP values exceeding a threshold may be excluded from the selection window. Then, SL resources may be randomly selected from among the remaining resources in the selection window.

Alternatively, received signal strength indications (RS-SIs) are measured in periodic resources within the sensing window, and resources with less interference corresponding to the lower 20% of the RSSIs are identified. SL resources may be randomly selected from among resources included in the selection window among the periodic resources. For example, when PSCCH decoding is failed, this method may be used.

A bandwidth part (BWP) and a resource pool will be described below.

When bandwidth adaptation (BA) is used, the reception bandwidth and transmission bandwidth of the UE need not be as large as the bandwidth of a cell, and may be adjusted. For example, the network/BS may indicate bandwidth adjustment to the UE. For example, the UE may receive information/a configuration for bandwidth adjustment from the network/BS. In this case, the UE may perform bandwidth adjustment based on the received information/configuration. For example, the bandwidth adjustment may include decrease/increase of a bandwidth, change of the position of the bandwidth, or change of the subcarrier spacing (SCS) of the bandwidth.

For example, the bandwidth may be reduced during a low-activity period to save power. For example, the position of the bandwidth may move in the frequency domain. For example, the position of the bandwidth may be moved in the frequency domain to increase scheduling flexibility. For example, the SCS of the bandwidth may be changed. For example, the SCS of the bandwidth may be changed to allow different services. A subset of the total cell bandwidth of a cell may be referred to as a BWP. BA may be performed by configuring BWPs and indicating a current active BWP to the UE among the configured BWPs by the BS/network.

Figure 10:
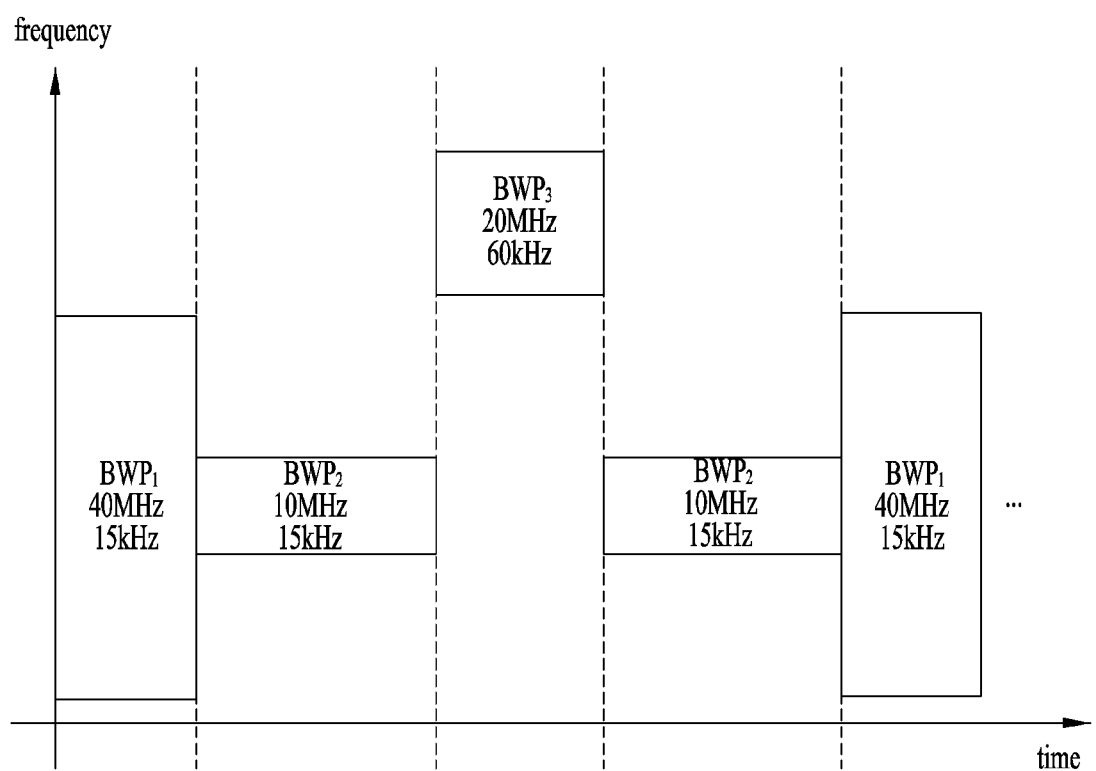
FIG. 10 is a diagram illustrating bandwidth parts (BWPs) and resource pools in V2X.

FIG. 10 illustrates an exemplary scenario in which BWPs are configured, to which the present disclosure may be applied.

Referring to FIG. 10, BWP1 with a bandwidth of 40 MHz and an SCS of 15 kHz, BWP2 with a bandwidth of 10 MHz and an SCS of 15 kHz, and BWP3 with a bandwidth of 20 MHz and an SCS of 60 kHz may be configured.

A BWP may be defined for SL. The same SL BWP may be used for transmission and reception. For example, a transmitting UE may transmit an SL channel or SL signal in a specific BWP, and a receiving UE may receive the SL channel or SL signal in the specific BWP. In a licensed carrier, an SL BWP may be defined separately from a Uu BWP, and the SL BWP may have separate configuration signaling from that of the Uu BWP. For example, the UE may receive a configuration for the SL BWP from the BS/network. The SL BWP may be (pre)configured in a carrier, for an out-of-coverage NR V2X UE and an RRC_IDLE UE. For an RRC_CONNECTED UE, at least one SL BWP may be activated in the carrier.

A resource pool may be a set of time-frequency resources available for SL transmission and/or SL reception. From the viewpoint of the UE, the time-domain resources of the resource pool may not be contiguous. A plurality of resource pools may be (pre)configured in one carrier, for the UE.

Figure 11:
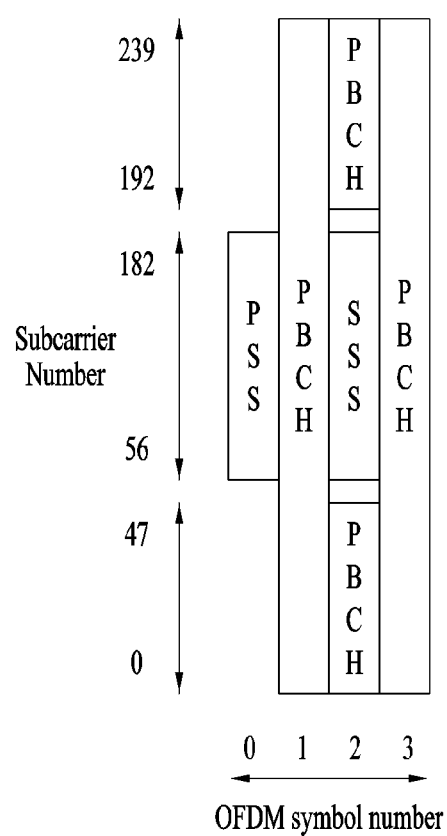
FIGS. 11, 12, and 13 are diagrams illustrating the composition of a synchronization signal/physical broadcast channel (SS/PBCH) block and a method of transmitting an SS/PBCH block.

FIG. 11 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 11, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| 1st step | PSS | * SS/PBCH block (SSB) symbol timing acquisition* Cell ID detection within a cell ID group(3 hypothesis) |
| 2nd Step | SSS | * Cell ID group detection (336 hypothesis) |
| 3rd Step | PBCH DMRS | * SSB index and Half frame (HF) index(Slot and frame boundary detection) |
| 4th Step | PBCH | * Time information (80 ms, System Frame Number (SFN), SSB index, HF)* Remaining Minimum System Information (RMSI) Control resource set (CORESET)/Search space configuration |
| 5th Step | PDCCH and PDSCH | * Cell access information* RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 12:
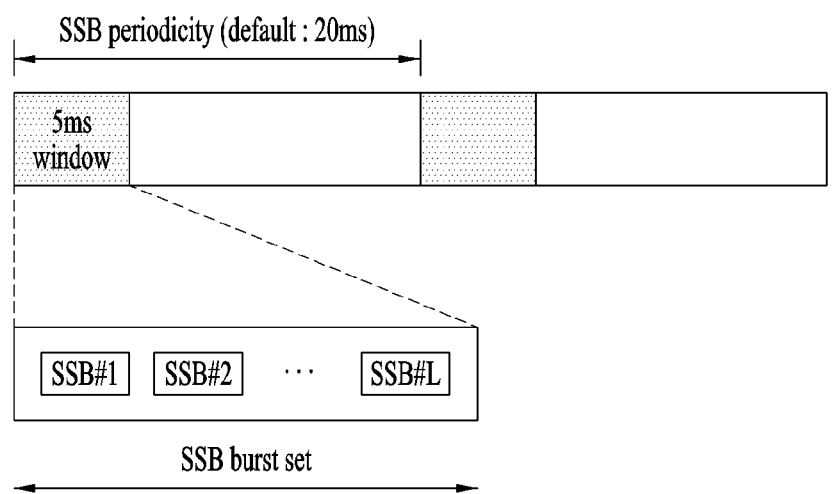

FIG. 12 illustrates SSB transmission. Referring to FIG. 12, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as (4, 8, 16, 20)+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as (2, 8)+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as (8, 12, 16, 20, 32, 36, 40, 44)+56*n where n=0, 1, 2, 3, 5, 6, 7, 8 for a carrier frequency above 6 GHz.

Figure 13:
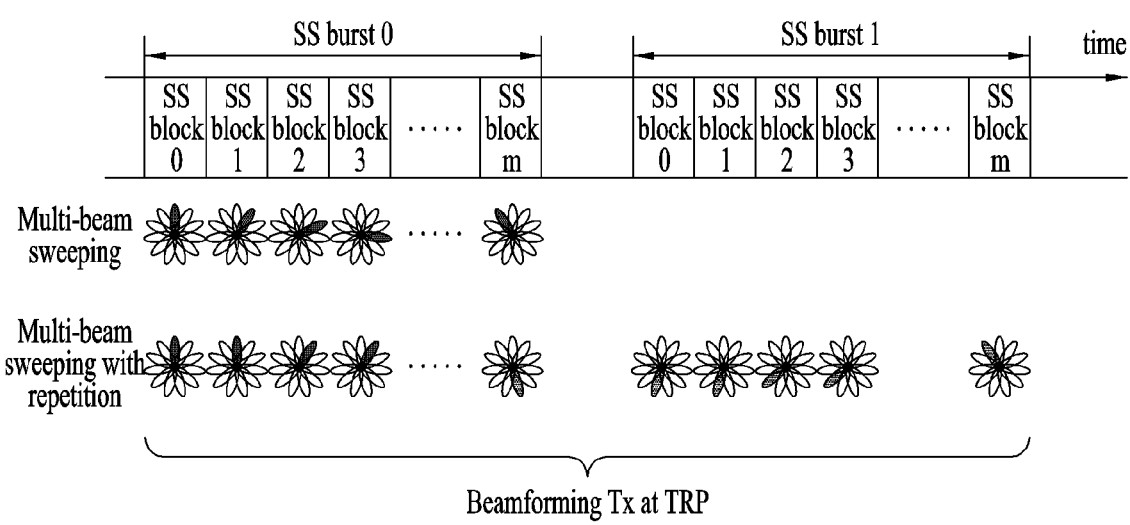

FIG. 13 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 13, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4
For frequency range from 3 GHz to 6 GHz, maximum number of beams=8
For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 14:
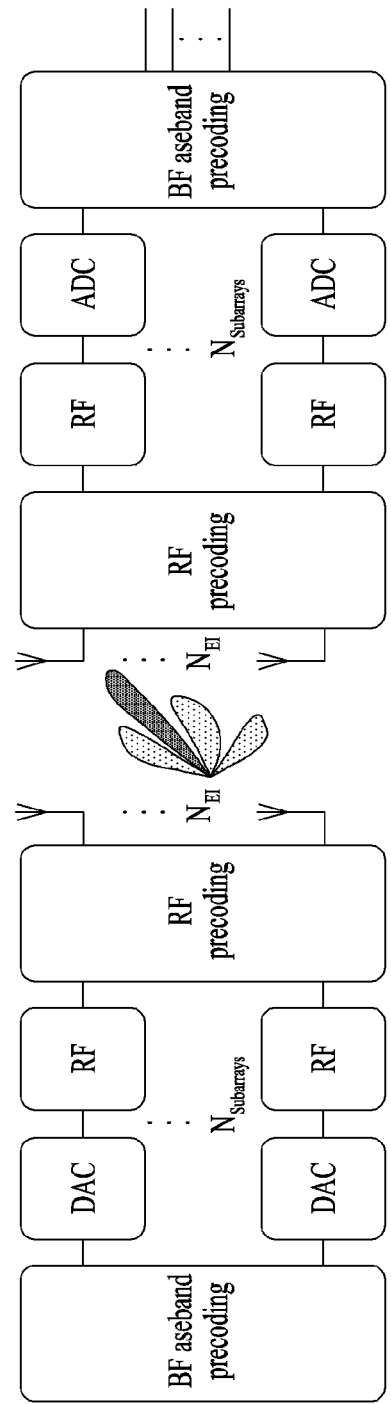
FIG. 14 is a diagram illustrating analog beamforming in the NR system.

FIG. 14 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 15:
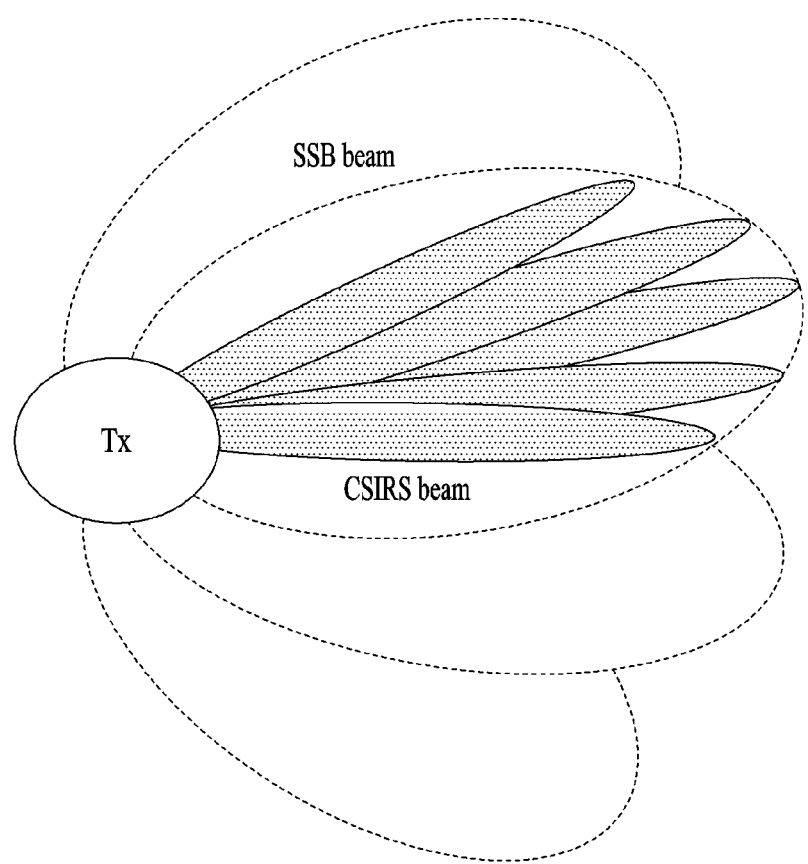
FIGS. 15, 16, 17, 18, and 19 are diagrams illustrating beam management in the NR system.

FIG. 15 is a diagram illustrating exemplary BF using an SSB and a CSI-RS.

Figure 16:
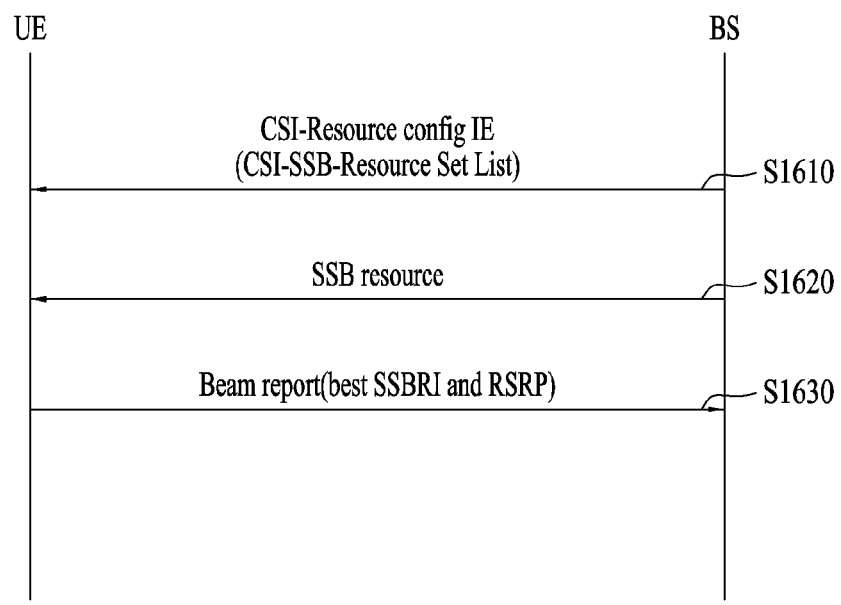

Referring to FIG. 15, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts 1. DL BM using SSB FIG. 16 is a diagram illustrating a signal flow for an exemplary DL BM process using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1610). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S1620).

When CSI-RS reportConfig related to an SSBRI and RSRP reporting has been configured, the UE reports a best SSBRI and an RSRP corresponding to the best SSBRI to the BS (S1630). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 17:
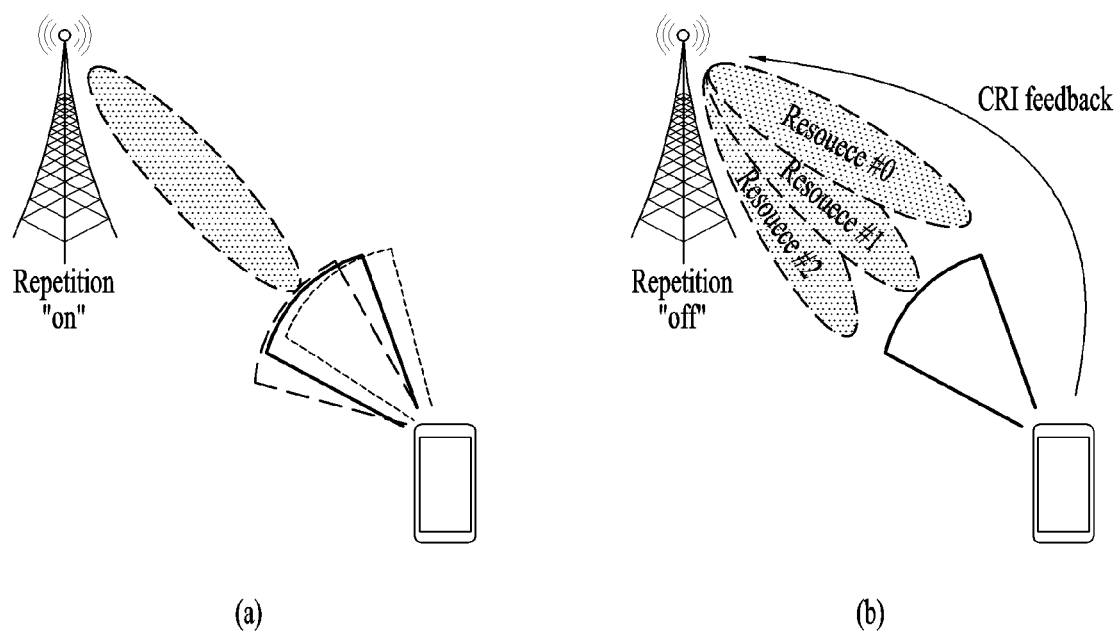

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 17 illustrates another exemplary DL BM process using a CSI-RS.

FIG. 17(a) illustrates an Rx beam refinement process of a UE, and FIG. 17(b) illustrates a Tx beam sweeping process of a BS. Further, FIG. 17(a) is for a case in which Repetition is set to 'ON', and FIG. 17(b) is for a case in which Repetition is set to 'OFF'.

Figure 18:
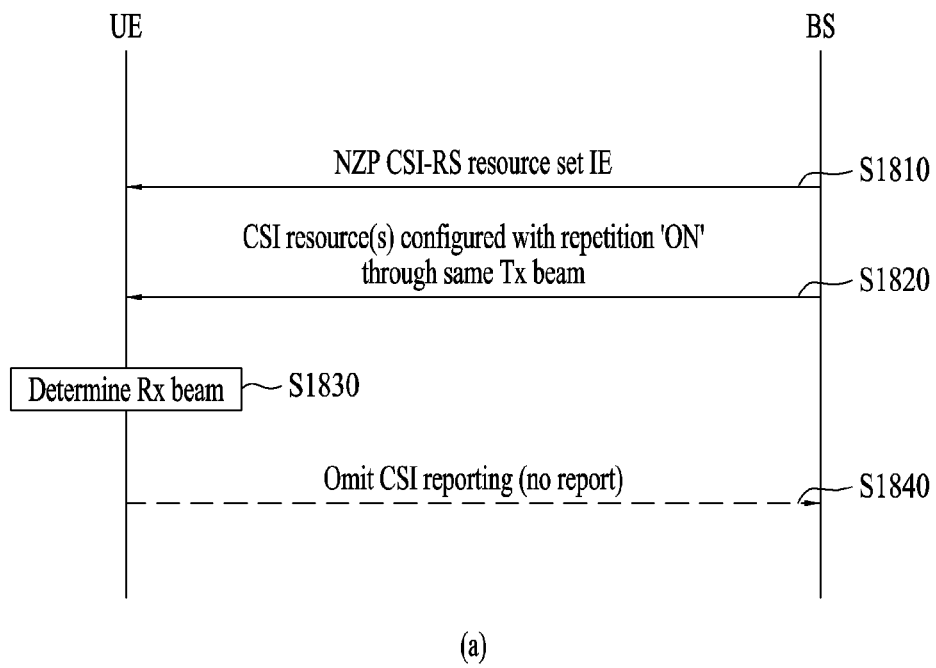
Figure 18:
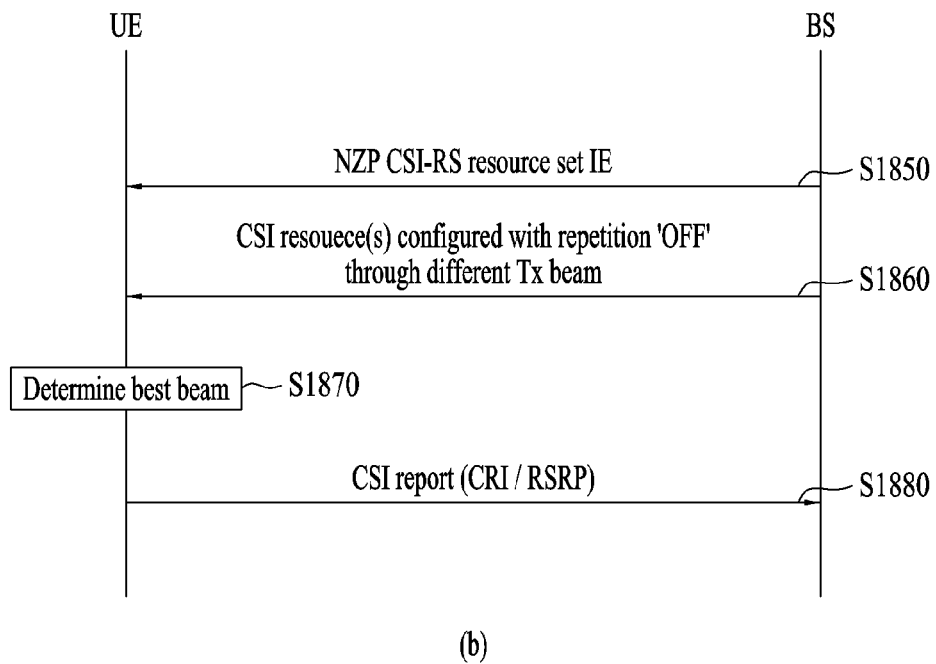

With reference to FIGS. 17(a) and 18(a), an Rx beam determination process of a UE will be described below.

FIG. 18(a) is a diagram illustrating a signal flow for an exemplary Rx beam determination process of a UE.

The UE receives an NZP CSI-RS resource set IE including an RRC parameter 'Repetition' from a BS by RRC signaling (S1810). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1820).

The UE determines its Rx beam (S1830).

The UE skips CSI reporting (S1840). That is, the UE may skip CSI reporting, when the RRC parameter 'Repetition' is set to 'ON'.

With reference to FIGS. 17(b) and 18(b), a Tx beam determination process of a BS will be described below.

FIG. 18(b) is a diagram illustrating an exemplary Tx beam determination process of a BS.

A UE receives an NZP CSI-RS resource set IE including an RRC parameter 'Repetition' from the BS by RRC signaling (S1850). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1860).

The UE selects (or determines) a best beam (S1870).

The UE reports the ID (e.g., CRI) of the selected beam and related quality information (e.g., an RSRP) to the BS (S1880). That is, the UE reports a CRI and an RSRP corresponding to the CRI, when a CSI-RS is transmitted for BM.

Figure 19:
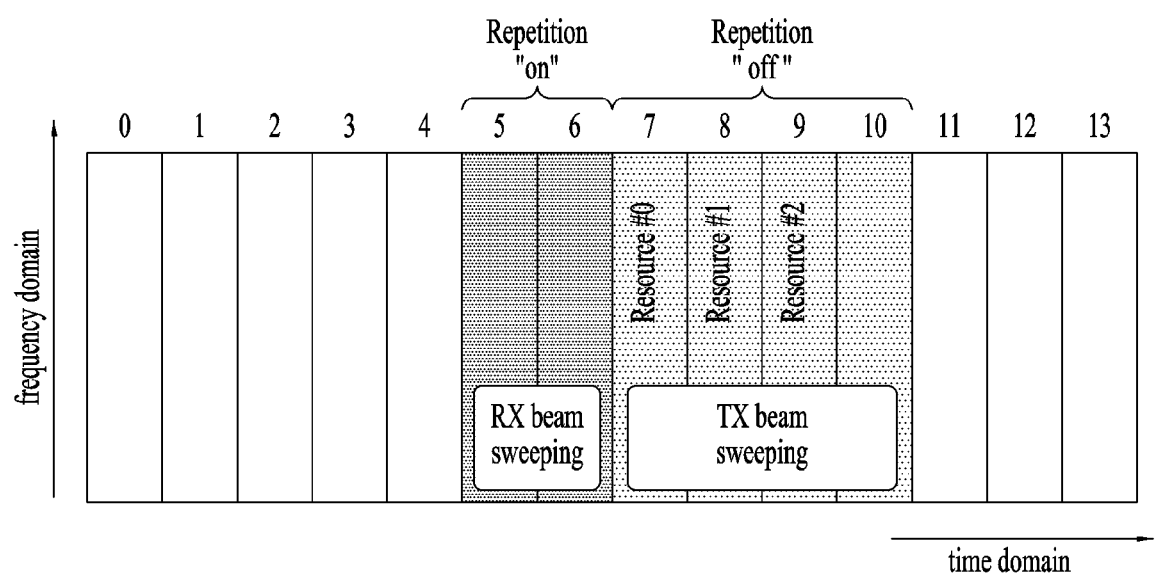

FIG. 19 is a diagram illustrating exemplary resource allocation in the time and frequency domains, which is related to the operation of FIG. 17.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 4 describes an example of a TCI-State IE. The TC-State IE is related to a QCL type corresponding to one or two DL RSs.

TABLE 4

```
-- ASN1START
-- TAG-TCI-STATE-START
TCI-State ::=                    SEQUENCE {
    tci-StateId                      TCI-StateId,
    qcl-Type1                        QCL-Info,
    qcl-Type2                        QCL-Info
                                     OPTIONAL, -- Need R
    . . .
}
QCL-Info ::=                     SEQUENCE {
    cell                             ServCell Index
                                     OPTIONAL, -- Need R
    bwp-Id                           BWP-Id
                                     OPTIONAL, -- Cond CSI-RS-Indicated
    referenceSignal                  CHOICE {
        csi-rs                           NZP-CSI-RS-ResourceId,
        ssb                              SSB-Index
    },
    qcl-Type                         ENUMERATED {typeA, typeB,
typeC, typeD},
    . . .
}
-- TAG-TCI-STATE-STOP
-- ASN1STOP
```

In Table 4, 'bwp-Id' identifies aDL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (OCL)

The UE may receive alist of upto MTCI-State configurations to decode aPDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': (Doppler shift, Doppler spread, average delay, delay spread)
'QCL-TypeB': (Doppler shift, Doppler spread)
'QCL-TypeC': (Doppler shift, average delay)
'QCL-TypeD': (Spatial Rx parameter)

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

Beam Failure Recovery (BFR) Process

In a beamforming system, radio link failure (RLF) may occur frequently due to rotation or movement of a UE or beamforming blockage. Therefore, NR supports BFR to prevent frequent RLF occurrences. BFR is similar to RLF recovery and may be supported when the UE has knowledge of new candidate beam(s).

For beam failure detection, the BS configures an RS for beam failure detection for the UE. When the number of beam failure indications from the physical layer of the UE reaches a threshold set by RRC signaling within a period set by RRC signaling from the BS, the UE declares beam failure.

After detecting the beam failure, the UE triggers BFR by initiating a random access procedure on a PCell and performs BFR by selecting a suitable beam (if the BS has provided dedicated random access resources for certain beams, these are prioritized by the UE). Upon completion of the random access procedure, the UE considers that the BFR has been completed.

Radio Resource Management (RRM) Measurement

The wireless communication system supports RRM operations including power control, scheduling, cell search, cell reselection, handover, radio link or connection monitoring, and connection establishment/re-establishment. A serving cell may request RRM measurement information which is measurement values required for an RRM operation to the UE. Particularly, the UE may measure and report information about each cell, such as cell search information, reference signal received power (RSRP), and reference signal received quality (RSRQ). Specifically, the UE receives 'measConfig' in a higher-layer signal for RRM measurement from the serving cell in the LTE system. Then the UE measures RSRP or RSRQ according to information included in 'measConfig'. TS 38.215 for the NR system defines RSRP, RSRQ, and received signal strength indicator (RSSI) as follows.

RSRP: RSRP is defined as the linear average over the power contributions (in [W]) of the REs that carry cell-specific reference signals (CRSs) or channel state information-reference signals (CSI-RSs) in a measurement frequency bandwidth. Particularly in NR, RSRP may be defined as the linear average over the power contributions (in [W]) of the REs that carry a secondary synchronization signal (SSS).

For RSRP determination, CRS R0 of TS 36.211 is used. To increase reliability, CRS R1 may be used in addition to CRS R0 to determine RSRP. A reference point for the RSRP should be the antenna connector of the UE. When receive diversity is used, a reported RSRP value should not be lower than the RSRP of any of individual diversity branches.

RSRQ: RSRQ is defined as the ratio N×RSRP/(E-UTRA/ NR carrier RSSI or CSI-RSSI) where N is the number of RBs of the E-UTRA/NR carrier RSSI measurement bandwidth or the CSI-RSSI measurement bandwidth. The "N×RSRP" measurement and "E-UTRA/NR carrier RSSI or CSI-RSSI" measurement are performed over the same RB set.

RSSI: RSSI is defined as the received wideband power, including thermal noise and noise generated within the bandwidth defined by a receiver pulse shaping filter. In this case, a reference point for the RSSI should also be the antenna connector of the UE. When receive diversity is used, a reported RSSI value should not be lower than the RSSI of any of individual diversity branches.

Before the description of the present proposal, it is clarified that Device A or Device B described in the present proposal may be interpreted in the context of various devices described with reference to FIGS. 22 to 25, not limited to a particular device.

Figure 20:
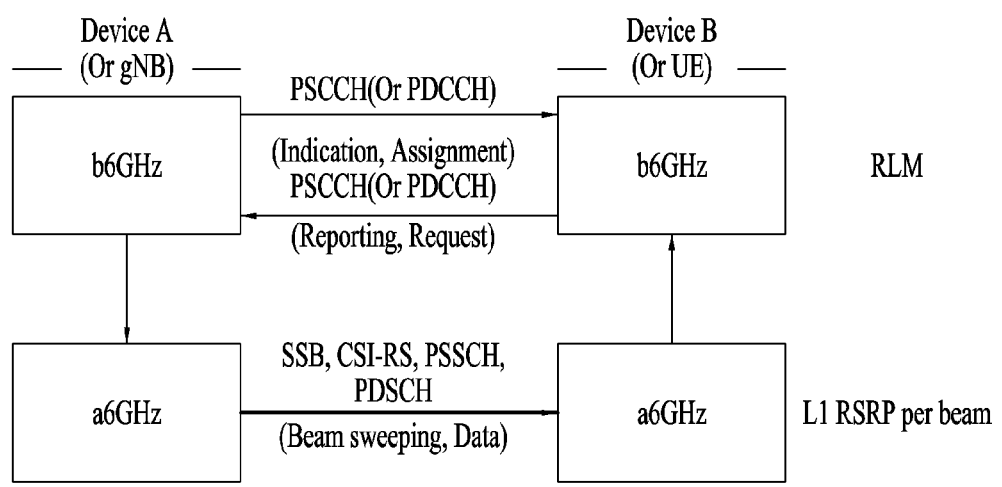
FIG. 20 is a diagram illustrating an implementation example of operations of transmission and reception apparatuses according to the present disclosure.

For example, both of Device A and Device B of FIG. 20 may be D2D UEs for performing D2D communication, or Device A may be a gNB, and Device B may be a D2D UE. In addition, Device A described in FIG. 20 may operate as a relay UE for transmitting a signal received from a gNB to Device B.

Before the description of the present proposal, the definitions and/or technical significance of terms used herein will be described below.

(1) Transmission (Tx) beamforming, multi-beam sweeping, Tx beam selection, reception (Rx) beamforming, Rx beam tracking, and beam management A signal experiences more attenuation in a high frequency band than in a low frequency band. In this regard, it is considered to use multiple antennas in a communication system using both high and low frequency bands to overcome signal attenuation in the high frequency band and secure coverage close in size to the "communication coverage" of the low frequency band. In other words, a method of increasing effective isotropic radiated power (EIRP) by using multiple antennas is under consideration. The increase of EIRP through beamforming advantageously enables transmission of a signal over a long distance. In contrast, since with beamforming, the width of a beam to which 3 dB attenuation occurs becomes narrow, it is difficult to transmit a signal to multiple receivers distributed over a wide area at once by one beam. Moreover, when communicating with a specific receiver, a transmitter may not locate the specific receiver. Accordingly, when the transmitter selects any Tx beam for transmission, communication between the transmitter and the receiver may not be possible.

In order to overcome the above-described shortcomings of beamforming, "multi-beam sweeping" and "Tx beam selection" may be adopted. Narrow beams directed in various directions are transmitted over a plurality of time points in "multi-beam sweeping", and a Tx beam suitable for a specific receiver is used selectively based on information reported by the specific receiver in "Tx beam selection". With multi-beam sweeping, information may be delivered to an unspecified receiver or an unspecified group of receivers mainly distributed over a wide area. For example, multi-beam sweeping may be used to transmit a synchronization signal, system information, paging information, and so on to a plurality of receivers distributed over a wide area. Tx beam selection is used to deliver transmission information to a specific receiver. For this purpose, the transmitter may transmit narrow beams directed in different directions to the receiver, and the receiver may measure the reception sensitivity of the transmitted beams and then transmit the reception sensitivity measurement of each beam to the transmitter. The transmitter may select a Tx beam suitable for the receiver based on the measurements reported by the receiver.

In addition to beamforming at the transmitter, beamforming at the receiver may further increase the reception sensitivity of the receiver. As in Tx beamforming, Rx beams may be narrow in Rx beamforming. In this case, when an Rx beam is steered in a specific direction, the reception sensitivity of a signal may be increased, whereas when the Rx beam is steered in a different direction, the reception sensitivity of the signal may be decreased. Accordingly, the receiver may perform "Rx beam tracking" to find a beam having the best reception sensitivity. For this purpose, the transmitter may repeatedly transmit a specific signal with a specific Tx beam to the receiver, and the receiver may receive the repeated specific signal, while changing an Rx beam and measure the reception sensitivity of each Rx beam. The receiver may then select an Rx beam having the best reception sensitivity and receive a control/data channel with the Rx beam.

In conclusion, when the directions of a Tx beam and an Rx beam are appropriately paired, the reception sensitivity of the receiver may be improved. As such, a Tx beam and an Rx beam that improve the reception sensitivity of a receiver are referred to as a "Tx-Rx beam pair". As a wireless channel environment changes, the Tx-Rx beam pair may also be changed to a Tx-Rx beam pair having a better reception sensitivity in the changed wireless channel environment. In the NR system, it is important to maintain a reception sensitivity at or above a certain level even in an environment in which a channel is changed as described above. Therefore, "beam management" for adaptively changing an appropriate "Tx-Rx beam pair" may be important for "Tx beam selection".

(2) SSB (Synchronization Signal Block)

For time synchronization between a transmitter and a receiver, the transmitter transmits a "bundle of signals and channels" including a synchronization signal. A "bundle of signals and channels" includes at least a synchronization signal, and may be configured to include at least some of a channel carrying system information, a signal carrying time information, and a signal transmitted for channel quality measurement. In this proposal, the "bundle of signals and channels" is called a synchronization signal block (SSB).

For example, the SSB may include a PSS, an SSS, and a PBCH.

(3) QCL of SSB

As the signals and channels of the SSB have almost similar radio channel elements such as Doppler shift, Doppler spread, and average delay, they may be assumed to be in the same channel state. For example, when a "bundle of signals and channels" are transmitted and received with the same Tx beam and the same Rx beam, it may be said that the radio channels are almost similar.

The transmitter may repeatedly transmit one or more SSBs at different time points within a certain time range. In this case, the transmitter may repeatedly transmit the SSBs with the same or different Tx beams. When the transmitter repeatedly transmits the SSBs with the same Tx beam and the receiver is capable of generating multiple Rx beams, the receiver may receive the repeatedly transmitted SSBs with the same Rx beam, may receive the repeatedly transmitted SSBs while switching Rx beams, or may receive the signals and channels included in an SSB, while switching Rx beams.

When the transmitter transmits a plurality of SSBs, while switching Tx beams for the respective SSBs, the receiver may receive the signals with a single beam. In this case, it may be assumed that the SSBs are transmitted in different radio channel states (Doppler shift, Doppler spread, average delay, beam transmission space, and so on).

(4) Antenna Port

An SSB is transmitted through a single "antenna port". The "antenna port" is a logical concept, not meaning an actual physical antenna end. In other words, the antenna port may be regarded as a unit that generates a radio channel path through which a signal or channel is transmitted from the transmitter.

For example, when the transmitter has N Tx physical antennas and transmits different signals or channels through the individual antennas, this may mean that the signals are transmitted through N antenna ports. Only when the receiver has N or more Rx antennas, the receiver is capable of distinguishing the signals transmitted through the N antenna ports of the transmitter. In another example, when the transmitter has N Tx antennas and transmits the same signal or channel through all of the individual antennas, this may mean that the signal or channel is transmitted through one antenna port. In this case, the signals radiated to the air through the N Tx antennas are mixed with each other, and radio channels through which the same signals or channels are transmitted becomes one radio channel. Then, the receiver may demodulate the signals despite one Rx antenna.

In an environment where there are many actual physical antennas, when an analog beamformer forms a Tx beam or an Rx beam, the number of "Tx beams that may be radiated at the same time" defines the maximum number of "antenna ports". For example, when two beams may be transmitted at the same time, this means that up to two antenna ports are available. When different signals and channels are transmitted with two Tx beams, this may be referred to as 2-antenna port transmission, whereas when the same signal and channel are transmitted with two Tx beams, this may be referred to as single-antenna port transmission.

For the IEEE 802.11ad/ay system and the 3GPP 5G NR system (hereinafter, NR system), beamforming using multiple antennas is considered as a method of reducing signal attenuation in a high frequency band.

In IEEE 802.11ad, beam management may be performed in two steps. On the assumption that a first wireless device (hereinafter referred to as "Alpha") and a second wireless device (hereinafter referred to as "Bravo") perform wireless communication in a high frequency band, the 2-step process for beam management will be described below.

1) The first wireless device, "Alpha" transmits a plurality of narrow beams over a plurality of time points. In this case, the second wireless device "Bravo" may receive specific signals transmitted with the plurality of Tx beams by "Alpha" by using a specific wide beam, measure the signal strengths of the specific signals, and select a Tx beam determined as best. Then, "Bravo" may transmit a plurality of narrow beams over a plurality of time points, and "Alpha" may receive a specific signal with a specific wide beam 2) "Bravo" transmits, to "Alpha", information about a Tx beam with a high reception sensitivity among the beams transmitted by "Alpha". "Alpha" may also transmit, to "Bravo", information about a Tx beam with a high reception sensitivity among the beams transmitted by "Bravo". In this manner, beam pairing may be performed between "Alpha" and "Bravo".

In the 3GPP 5G NR system, distinction may be made between beam management during initial access and beam management in the RRC_CONNECTED state.

During initial access or in the RRC_IDLE/INACTIVE state, a UE may receive a plurality of SSBs transmitted with different Tx beams in various directions on DL, with a specific Rx beam. The UE may then measure the reception sensitivity of each SSB, such as RSRP, and select a Tx beam with a good reception sensitivity. When the UE uses a plurality of Rx beams, the UE may receive the SSBs over a plurality of time points, while switching Rx beams, measure the reception sensitivity of each SSB, and select an Rx beam with a good reception sensitivity and an SSB (i.e., Tx beam)

with a good reception sensitivity. SSBs may be associated with RACH resources in the NR system.

Therefore, when the UE selects an RACH resource and transmits an RACH preamble in the selected RACH resource, the UE may transmit the RACH preamble in one of at least one RACH resource associated with a specific SSB to a gNB, and thus the gNB may obtain information about a Tx beam selected by the UE based on the RACH resource carrying the RACH preamble.

In the RRC_CONNECTED state, the UE may receive a plurality of SSBs or CSI-RSs on the DL from the gNB. After measuring the reception sensitivity of each of the received plurality of SSBs or CSI-RSs, the UE may report at least one beam index such as an SSB index or a CSI-RS resource indicator (CRI) and/or the reception sensitivity of at least one beam to the gNB. When the UE receives DL signals with a plurality of Rx beams, the UE may detect an appropriate Rx beam among the plurality of Rx beams and report the detected Rx beam to the gNB. The gNB may obtain information about a Tx beam having a good reception sensitivity based on the reported information. In this case, when the gNB transmits a signal with the Tx beam, the gNB may expect that the UE will receive the signal with the appropriate Rx beam. Further, the gNB may transmit information about a Tx beam to be used for information transmission at a specific time to the UE. That is, even though the UE does not report information about a UE-preferred Rx beam to the gNB, the gNB and the UE may determine that appropriate Tx beam and Rx beam have been paired for use in signal transmission.

Signal attenuation increases with the distance in a higher frequency band. To avert this problem, more Tx/Rx antennas may be used. The increase in the number of Tx/Rx antennas in turn increases the number of candidate beams for transmission/reception and the number of candidates available for Tx-Rx beam paring. Therefore, more time may be taken to detect an appropriate Tx-Rx beam pair.

However, when beam pairing takes much time in information transmission/reception in a high frequency band, for high-speed data transmission, overhead may increase significantly for a time for preparing for information transmission relative to a time for the information transmission. Moreover, when a time available for communication between a specific transmitter and a receiver is limited due to fast movement or a limited resource occupancy time, the beam pairing time may increase, which results in lack of an information delivery time.

To report a preferred beam for beam management in a high frequency band, a beam with which to transmit and receive a channel for the reporting should be predetermined. For this purpose, a process of configuring a Tx/Rx beam for control information such as the report may be additionally required.

In view of the low diffraction and high linearity of a high frequency band, for example, at or above 6 GHz, the presence of an obstacle between a transmitter and a receiver may cause rapid signal attenuation and hence instantaneous occurrence and continuation of communication disconnection. In this case, it may take a very long time to determine whether radio link failure (RLF) that makes communication impossible has occurred or "beam recovery" is needed to change a beam pair. This may be a cause of making high-speed data transmission difficult in the high frequency band, when a fast moving object communicates.

Particularly in V2V communication, the distance between vehicles and the moving directions of the vehicles change from time to time. Accordingly, the Tx/Rx beam may need to be changed at any time. Because a mismatch between Tx and Rx beams may often occur in the high frequency band due to the use of narrow Tx and Rx beams, the beam mismatch may delay data transmission, even though a channel quality good enough for data communication may be provided to close vehicles.

To solve the above problem, therefore, the present disclosure proposes that control information, channel state report information, beam control information, radio frequency management information, and so on, which are required for wireless communication in a relatively high frequency band, are transmitted and received in a relatively low frequency band in a wireless communication system using a plurality of frequency bands with a very large frequency spacing, for example, a wireless communication system to which carrier aggregation (CA) is applied.

A transmitter and a receiver may use a different number of Tx and Rx beams for signal and channel transmission in each frequency band. The transmitter and receiver may use more Tx and Rx beams in a high frequency band than in a low frequency band.

Control information, CSI, beam control information, and a data channel may be transmitted and received on a radio channel in a low frequency band, for example, at or below 6 GHz. Additionally, an RS such as a CSI-RS, an SSB, and a DMRS may be transmitted by beamforming and a signal quality may be measured based on the beamformed RS. Further, control information, CSI, and beam control information for communication in the low frequency band and control information, in a high frequency band, and beam control information for communication in the high frequency band may be transmitted and received.

A UE or D2D communication device performing wireless communication in the low frequency band may transmit CSI and beam state information measured in the high frequency band to a BS or neighboring device in the low frequency band.

Further, the UE or D2D communication device performing wireless communication in the low frequency band may request beam recovery for wireless communication in the high frequency band through the low frequency band. The BS or neighboring device may receive the beam recovery request signal and transmit an RS in the high frequency band, for high-frequency band beam management. The UE or D2D communication device may receive the RS, measure the signal quality of the RS, and transmit information about the signal quality in the low frequency band to the BS or neighboring device.

When determining that beam failure has occurred to a radio channel in the high frequency band, the UE may transmit a preconfigured UL signal/channel and the D2D communication device may transmit a preconfigured SL signal/channel, to request beam recovery. Beam failure may refer to a state in which the channel states of available candidate beams become poor to or below a predetermined level and the poor channel states continue for a predetermined time or longer. The preconfigured UL signal/channel may be a PRACH preamble, a PUCCH, or the like.

The UE or D2D communication device performing wireless communication in the low frequency band may perform radio link monitoring (RLM) in the low frequency band. In other words, the UE or D2D communication device may determine whether wireless communication with the BS or neighboring device in the low and high frequency bands is possible, based on the radio channel state measurement of the low frequency band. A frequency band serving as an RLM reference may be designated by higher-layer signaling and/or physical-layer signaling. Alternatively, the UE or D2D communication device receiving the beamformed RS may measure the RSRP of each frequency band and determine a frequency band to serve as the RLM reference. Additionally, RLM may be performed based on at least one frequency band in which the beamformed RS has been received.

The above description may be extended to CSI reporting, not limited to RLM. For example, the UE or D2D communication device may report CSI of the high frequency band and the low frequency band based on the radio channel state measurement of the low frequency band. The above description may also be extended to beam state reporting, beam failure recovery, and so on.

Further, the UE or D2D communication device performing wireless communication in the low frequency band measures the channel state of a neighboring cell or neighboring device. The UE or D2D communication device may report CSI to the BS or neighboring device of its serving cell. The BS or neighboring device of the serving cell may receive the CSI. The UE or D2D communication device may transmit and receive the RS and the CSI in a unicast manner. The CSI may be interference information caused by other signals.

A transmitter may transmit a beamformed RS in a high frequency band, for example, at or above 6 GHz, and a receiver may measure the RSRP of each beam based on the beamformed RS. Additionally, the receiver may track an Rx beam. A data channel may be transmitted and received in the high frequency band. That is, because a beam pair is highly likely to be unpaired due to the mobility of vehicles in V2V communication, a signal requiring stability may be transmitted mainly in the low frequency band, and large-capacity data may be transmitted in the high frequency band.

With reference to FIG. 20, an embodiment of the present disclosure will be described. Referring to FIG. 20, a BS or D2D communication device (hereinafter, referred to as "Device A") may transmit, in a low frequency band, information related to a beamformed RS such as a beamformed SSB or CSI-RS to be transmitted in a high frequency band to a UE or D2D communication device (hereinafter, referred to as "Device B"). Device A may transmit the beamformed RS and Device B may receive the beamformed RS, in the high frequency band. Device B may measure the received signal quality of each beam, such as L1 RSRP, based on the RS and transmit the measurement in the low frequency band to Device A.

Upon receipt of the measurement, Device A may determine information related to candidate Tx beams for use in communication in the high frequency band based on the measurement and then transmit the information related to the candidate Tx beams used in communication in the high frequency band to Device B. Device A may further transmit a control channel, a data channel, and an RS to Device B with at least one of the candidate Tx beams in the high frequency band.

Upon receipt of the beamformed RS in the high frequency band from Device A, Device B may measure a channel quality and determine whether beam failure has occurred. When determining that beam failure has occurred, Device B may transmit a beam recovery request in the low frequency band to Device A.

Further, Device B may measure the channel quality of the received RS in the low frequency band, and the serving cell or neighboring D2D device may monitor the state of the radio channel quality.

According to the present disclosure, a data transmission rate may be increased by shortening a time taken for detecting a beam pair, and beam management in a high frequency band may be performed efficiently by transmitting and receiving information for transmission/reception in the high frequency band on a low-frequency band channel which is stable. Further, since the channel qualities of the low and high frequency bands are managed together, a stable communication environment may be provided.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 21:
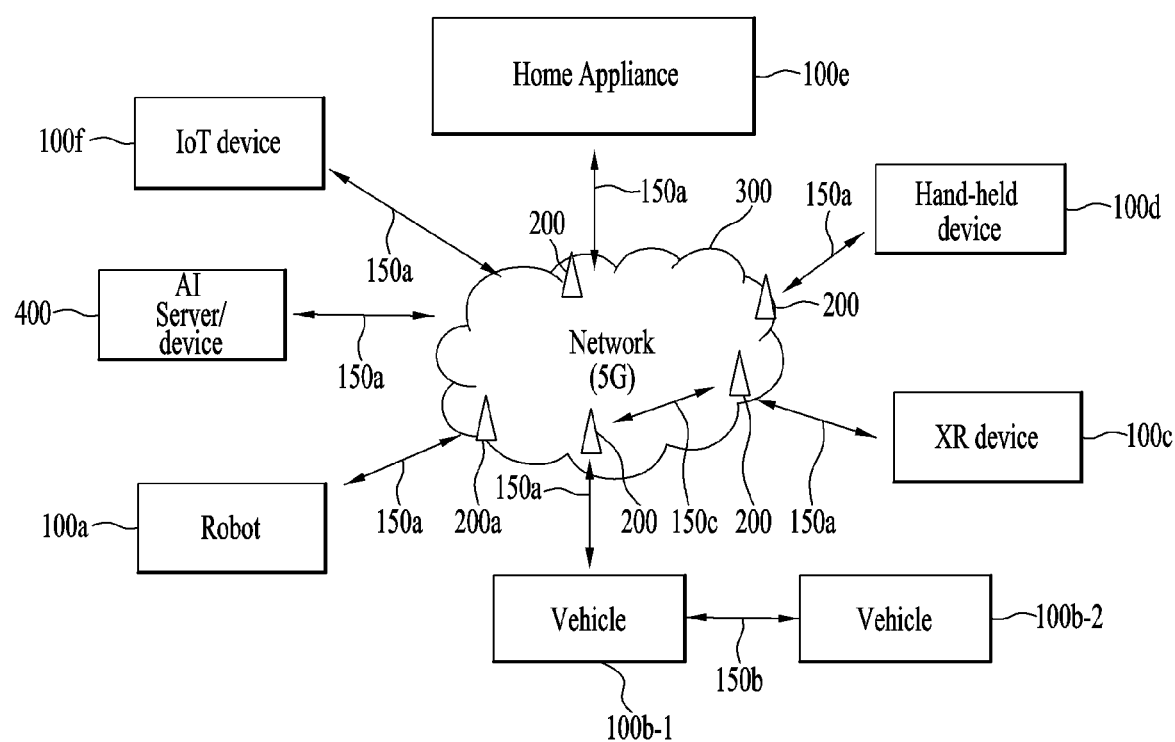
FIG. 21 illustrates an example of a communication system to which embodiments of the present disclosure are applied.

FIG. 21 illustrates a communication system 1 applied to the present disclosure.

Referring to FIG. 21, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., SL communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, SL communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 22:
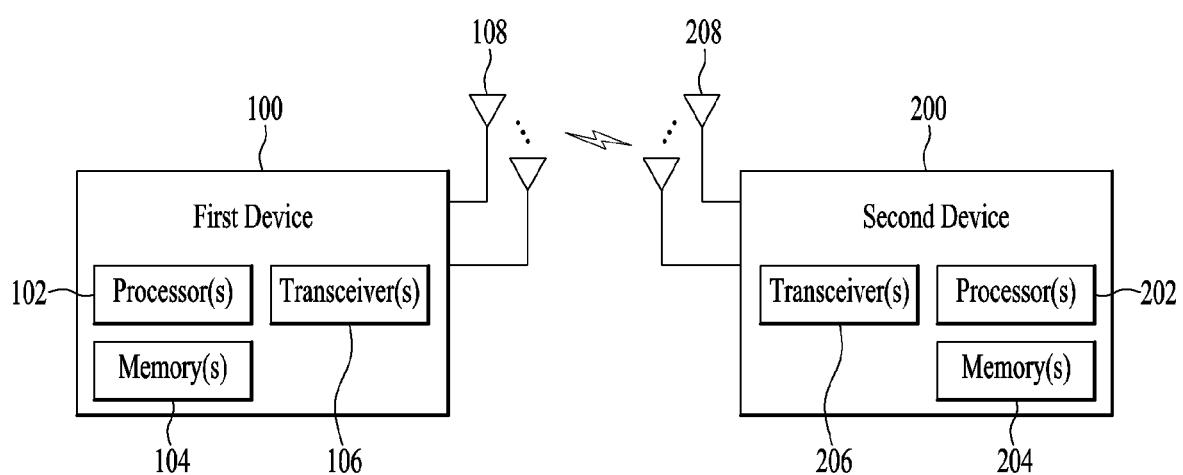
FIGS. 22 to 25 illustrate examples of various wireless devices to which embodiments of the present disclosure are applied.

FIG. 22 illustrates wireless devices applicable to the present disclosure.

Referring to FIG. 22, a first wireless device 100 and a second wireless device 200 may transmit wireless signals through a variety of RATs (e.g., LTE and NR). (The first wireless device 100 and the second wireless device 200) may correspond to (the wireless device 100*x* and the BS 200) and/or (the wireless device 100*x* and the wireless device 100*x*) of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations which are controlled by the processor(s) 102 and stored in the memory(s) 104 in the first wireless device 100 according to an embodiment of the present disclosure will be described.

While the following operations are described in the context of a control operation of the processor(s) 102 from the perspective of the processor(s) 102, software code for performing the operations may be stored in the memory(s) 104.

The processor(s) 102 may control the transceiver(s) 106 to transmit control information, CSI, beam control information, and a data channel on a radio channel in a low frequency band such as a frequency band at or below 6 GHz. The processor(s) 102 may further control the transceiver(s) 106 to transmit a beamformed RS such as a beamformed CSI-RS, SSB, and DMRS to the second wireless device 200.

Further, the processor(s) 102 may control the transceiver(s) 106 to receive a beam recovery request from the second wireless device 200 and to transmit an RS in a high frequency band, for beam management in the high frequency band.

The processor(s) 102 may control the transceiver(s) 106 to transmit the beamformed RS and control the transceiver(s) 106 to transmit a data channel, in the high frequency band such as a frequency band at or above 6 GHz.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations which are controlled by the processor(s) 202 and stored in the memory(s) 204 in the second wireless device 200 according to an embodiment of the present disclosure will be described.

While the following operations are described in the context of a control operation of the processor(s) 202 from the perspective of the processor(s) 202, software code for performing the operations may be stored in the memory(s) 204.

The processor(s) 202 may control the transceiver(s) 206 to receive a beamformed RS such as a beamformed CSI-RS, SSB, and DMRS on a radio channel in a low frequency band such as a frequency band at or below 6 GHz, and measure a signal quality based on the beamformed RS. The processor(s) 202 may further control the transceiver(s) 106 to transmit control information, CSI, and beam control information for communication in the low frequency band and control information, CSI, and beam control information for communication in the high frequency band to the first wireless device 100.

Further, the processor(s) 202 may control the transceiver(s) 206 to transmit, in the low frequency band, CSI and beam state information measured in the high frequency band to the first wireless device 100.

Further, the processor(s) 202 may control the transceiver(s) 206 to request beam recovery to the first wireless device 100 in the low frequency band. Further, the processor(s) 202 may control the transceiver(s) 206 to receive an RS and measure the signal quality of the RS, and control the transceiver 206 to transmit, in the low frequency band, information about the signal quality to the first wireless device 100.

When determining that beam failure has occurred to the radio channel of the high frequency band, the processor(s) 201 may control the transceiver(s) 206 to transmit a pre-configured UL or SL signal/channel to request beam recovery.

Further, the processor(s) 202 may perform RLM in the low frequency band. In other words, the processor(s) 202 may determine whether wireless communication with the first wireless device 100 in the low and high frequency bands is possible, based on the radio channel state measurement of the low frequency band.

Further, the processor(s) 202 performing wireless communicating in the low frequency band measures a channel state for communication with the first wireless device 100. The processor(s) 202 may control the transceiver 206 to report CSI to the first wireless device 100.

The processor(s) 202 may measure the RSRP of each beam based on the beamformed RS received from the first wireless device 100 in the high frequency band such as a frequency band at or above 6 GHz.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 23:
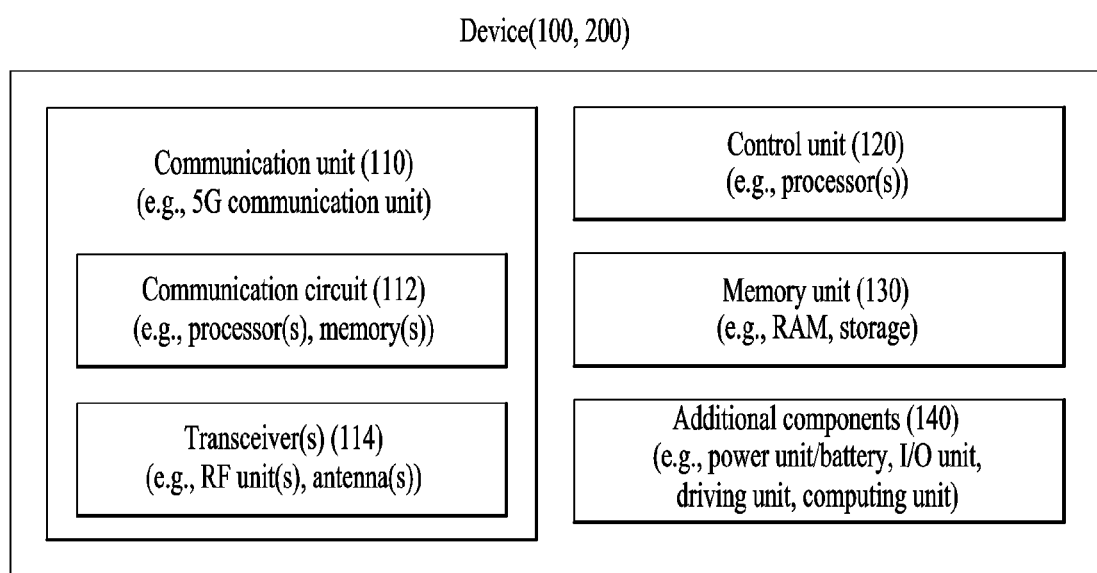

FIG. 23 illustrates another example of a wireless device applied to the present disclosure. The wireless device may be implemented in various forms according to a use case/service (refer to FIG. 21).

Figure 25:
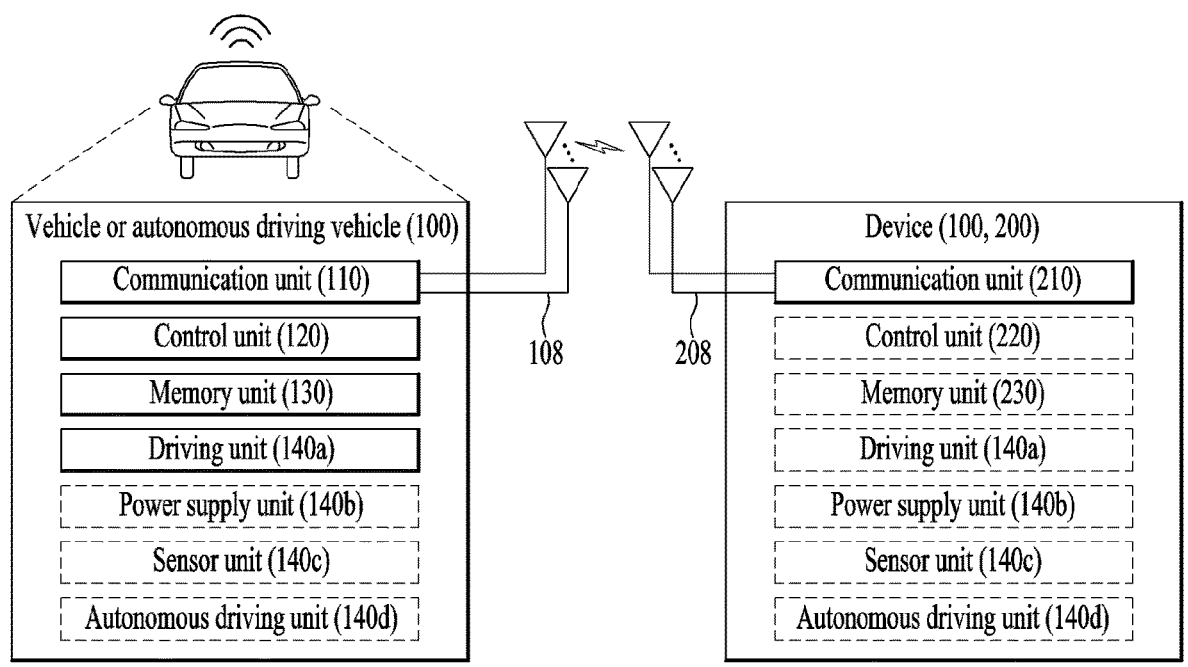

Referring to FIG. 23, wireless devices 100 and 200 may correspond to the wireless devices 100 and 200 of FIG. 25 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcasting terminal, a hologram device, a public safety device, an MTC device, a medical device, a FinTech device (or a finance device), a security device, a climate/environment device, the AI server/device (400 of FIG. 21), the BSs (200 of FIG. 21), a network node, or the like. The wireless device may be mobile or fixed according to a use case/service.

In FIG. 23, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 23 will hereinafter be described with reference to the attached drawings.

Figure 24:
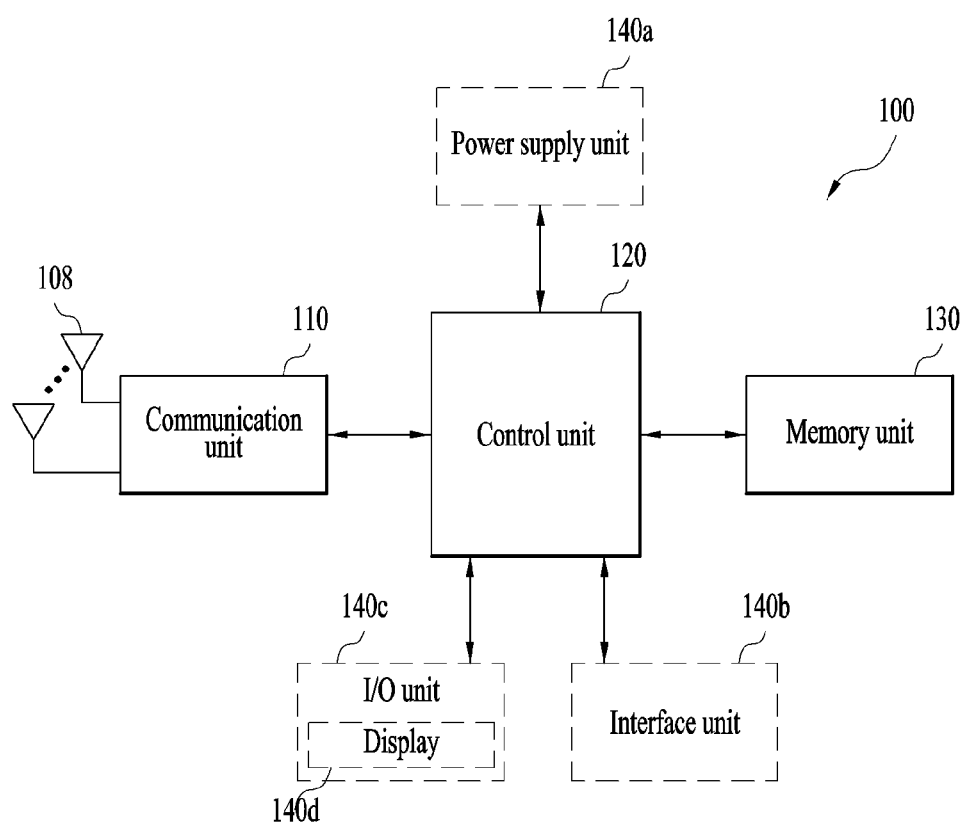

FIG. 24 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 24, the hand-held device 100 may include an antenna unit 108, a communication unit 110, a control unit 120, a memory unit 130, a power supply unit 140*a*, an interface unit 140*b*, and an input/output (I/O) unit 140*c*. The antenna unit 108 may be configured as a part of the communication unit 110. The blocks 110 to 130/140*a* to 140*c* correspond to the blocks 110 to 130/140 of FIG. 23, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140*a* may supply power to the hand-held device 100, and include a wired/wireless charging circuit and a battery. The interface unit 140*b* may support connection between the hand-held device and other external devices. The interface unit 140*b* may include various ports (e.g., an audio I/O port and a video I/O port) for connection to external devices. The I/O unit 140*c* may receive or output video information/signal, audio information/signal, data, and/or user-input information. The I/O unit 140*c* may include a camera, a microphone, a user input unit, a display 140*d*, a speaker, and/or a haptic module.

For example, for data communication, the I/O unit 140*c* may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

FIG. 25 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 26:
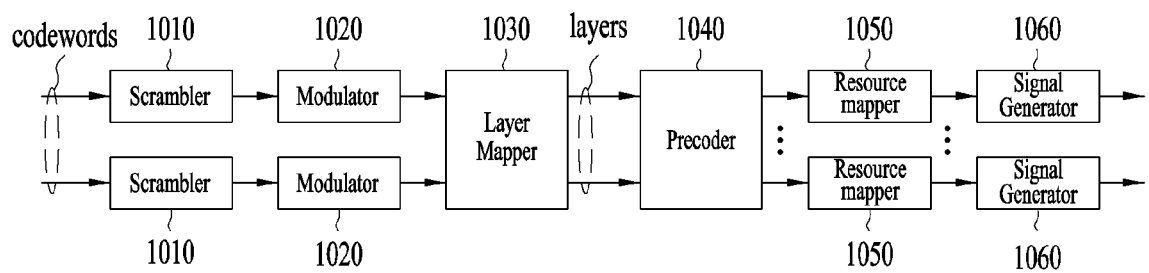
FIG. 26 illustrates an exemplary signal processing circuit to which embodiments of the present disclosure are applied.

FIG. 26 illustrates a signal processing circuit for Tx signals.

Referring to FIG. 26, a signal processing circuit 1000 may include a scrambler 1010, a modulator 1020, a layer mapper 1030, a precoder 1040, a resource mapper 1050, and a signal generator 1060. The operations/functions shown in FIG. 29 may be performed by the processors 102 and 202 and/or the transceivers 106 and 206 shown in FIG. 23, without being limited thereto. Hardware elements shown in FIG. 23 may be implemented by the processors 102 and 202 and/or the transceivers 106 and 206 shown in FIG. 23. For example, the blocks 1010 to 1060 may be implemented by the processors 102 and 202. In addition, the blocks 1010 to 1050 may be implemented by the processors 102 and 202 shown in FIG. 23, and the block 1060 may be implemented by the transceivers 106 and 206 shown in FIG. 23.

The codeword may be converted into a radio signal (or a radio frequency (RF) signal) through the signal processing circuit 1000 shown in FIG. 26. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for performing RLM have been described in the context of a 5G NewRAT system, they are also applicable to various wireless communication systems other than the 5G NewRAT system.

The invention claimed is:

1. A method of performing radio link monitoring (RLM) by a user equipment (UE) configured with a plurality of frequency bands in a wireless communication system, the method comprising:
receiving a first synchronization signal/physical broadcast channel block (SS/PBCH block);
determining a random access channel (RACH) resource based on the SS/PBCH block;
transmitting a physical RACH (PRACH) through the RACH resource;
based on the UE being in a radio resource control (RRC) connected mode based on the PRACH:
transmitting a beam recovery request based on a beam failure being occurred;
receiving a reference signal through a first frequency band, between the first frequency band and a second frequency band, based on the beam recovery request,
wherein the frequency band is lower than the second frequency band;
measuring a radio link quality of the first frequency band based on the reference signal;
determining both of the first frequency band and the second frequency band being available based on a value of the radio link quality of the first frequency band being higher than the threshold;
transmitting, through the first frequency band, information related to the radio link quality; and
transmitting, through the second frequency band, a physical uplink shared channel (PUSCH),
wherein the reference signal is a second SS/PBCH block or a channel state information-reference signal (CSI-RS),
wherein each of the first SS/PBCH block and the second SS/PBCH block comprises a primary synchronization signal (PSS), a secondary synchronization signal (SSS) and a physical broadcast channel (PBCH), and
wherein the radio link quality is determined based on a reference signal received power (RSRP) of the reference signal.

2. The method according to claim 1, wherein the UE is communicable with at least one of another UE, a network, a base station, or an autonomous driving vehicle.

3. An apparatus for performing radio link monitoring (RLM) in a wireless communication system, the apparatus comprising:
at least one processor; and
at least one memory operably connected to the at least one processor and configured to store instructions that, when executed, cause the at least one processor to perform operations comprising:
receiving a first synchronization signal/physical broadcast channel block (SS/PBCH block);
determining a random access channel (RACH) resource based on the SS/PBCH block;
transmitting a physical RACH (PRACH) through the RACH resource;
based on the UE being in a radio resource control (RRC) connected mode based on the PRACH:
transmitting a beam recovery request based on a beam failure being occurred;
receiving a reference signal through a first frequency band, between the first frequency band and a second frequency band, based on the beam recovery request,
wherein the frequency band is lower than the second frequency band;
measuring a radio link quality of the first frequency band based on the reference signal;
determining both of the first frequency band and the second frequency band being available based on a value of the radio link quality of the first frequency band being higher than the threshold;
transmitting, through the first frequency band, information related to the radio link quality; and
transmitting, through the second frequency band, a physical uplink shared channel (PUSCH), wherein the reference signal is a second SS/PBCH block or a channel state information-reference signal (CSI-RS), wherein each of the first SS/PBCH block and the second SS/PBCH block comprises a primary synchronization signal (PSS), a secondary synchronization signal (SSS) and a physical broadcast channel (PBCH), and wherein the radio link quality is determined based on a reference signal received power (RSRP) of the reference signal.

4. The apparatus according to claim 3, wherein the apparatus is communicable with at least one of a user equipment (UE), a network, a base station, or an autonomous driving vehicle.

5. A user equipment (UE) for performing radio link monitoring (RLM) in a wireless communication system, the UE comprising:

at least one transceiver;

at least one processor; and at least one memory operably connected to the at least one processor and configured to store instructions that, when executed, cause the at least one processor to perform operations comprising:

receiving a first synchronization signal/physical broadcast channel block (SS/PBCH block);

determining a random access channel (RACH) resource based on the SS/PBCH block;

transmitting a physical RACH (PRACH) through the RACH resource;

based on the UE being in a radio resource control (RRC) connected mode based on the PRACH:

transmitting a beam recovery request based on a beam failure being occurred;

receiving a reference signal through a first frequency band, between the first frequency band and a second frequency band, based on the beam recovery request, wherein the frequency band is lower than the second frequency band;

measuring a radio link quality of the first frequency band based on the reference signal;

determining both of the first frequency band and the second frequency band being available based on a value of the radio link quality of the first frequency band being higher than the threshold;

transmitting, through the first frequency band, information related to the radio link quality; and transmitting, through the second frequency band, a physical uplink shared channel (PUSCH), wherein the reference signal is a second SS/PBCH block or a channel state information-reference signal (CSI-RS), wherein each of the first SS/PBCH block and the second SS/PBCH block comprises a primary synchronization signal (PSS), a secondary synchronization signal (SSS) and a physical broadcast channel (PBCH), and wherein the radio link quality is determined based on a reference signal received power (RSRP) of the reference signal.

* * * * *